United States Patent
Fung et al.

(10) Patent No.: US 10,154,354 B2
(45) Date of Patent: Dec. 11, 2018

(54) ADVANCED ARTIFICIAL SOUND HEARING TRAINING

(71) Applicants: Stephen Fung, Macquarie University (AU); Alexander Von Brasch, Macquarie University (AU); Kieran Reed, Macquarie University (AU)

(72) Inventors: Stephen Fung, Macquarie University (AU); Alexander Von Brasch, Macquarie University (AU); Kieran Reed, Macquarie University (AU)

(73) Assignee: Cochlear Limited, Macquarie University, NSW (AU)

( * ) Notice: Subject to any disclaimer, the term of this patent is extended or adjusted under 35 U.S.C. 154(b) by 0 days.

(21) Appl. No.: 15/429,622

(22) Filed: Feb. 10, 2017

(65) Prior Publication Data
US 2018/0234776 A1    Aug. 16, 2018

(51) Int. Cl.
*H04R 25/00* (2006.01)
*H04S 1/00* (2006.01)
*G06T 19/00* (2011.01)

(52) U.S. Cl.
CPC .......... *H04R 25/552* (2013.01); *H04S 1/005* (2013.01); *G06T 19/006* (2013.01); *H04S 2400/11* (2013.01); *H04S 2420/01* (2013.01)

(58) Field of Classification Search
CPC ... H04R 25/552; H04S 1/005; H04S 2400/11; H04S 2420/01; G06T 19/006
See application file for complete search history.

(56) References Cited

U.S. PATENT DOCUMENTS

| | | |
|---|---|---|
| 7,561,707 B2 | 7/2009 | Kornagel |
| 7,676,372 B1 | 3/2010 | Oba |
| 2004/0152946 A1 | 8/2004 | Franck |
| 2005/0085343 A1 | 4/2005 | Burrows et al. |
| 2008/0153070 A1* | 6/2008 | Tyler .................. G09B 21/009 434/1 |
| 2011/0276109 A1 | 11/2011 | Bartel |
| 2014/0243913 A1 | 8/2014 | Lineaweaver |
| 2016/0142830 A1* | 5/2016 | Hu ........................ G02C 11/06 434/185 |
| 2016/0174000 A1 | 6/2016 | Ungstrup et al. |

(Continued)

FOREIGN PATENT DOCUMENTS

| | | |
|---|---|---|
| KR | 101490336 B1 | 2/2015 |
| WO | 2009/103823 A2 | 8/2009 |

OTHER PUBLICATIONS

HEARWorks™, Speech Perception Tests, Downloaded from Internet Feb. 10, 2017, http://hearworks.com.au/technology/audio-tests/.

(Continued)

*Primary Examiner* — Andrew L Sniezek
(74) *Attorney, Agent, or Firm* — Piloff & Passino LLP; Martin J. Cosenza

(57) ABSTRACT

A method, including the actions of obtaining access to a virtual reality system; activating a cochlear implant such that the cochlear implant evokes a hearing percept based on first input; and receiving second input from the virtual reality system in temporal proximity with the evocation of the hearing percept based on the first input, wherein the cochlear implant evokes a hearing percept based on the first input, and the second input is correlated with the first input.

29 Claims, 22 Drawing Sheets

(56) References Cited

U.S. PATENT DOCUMENTS

2016/0183027 A1 6/2016 Morrow
2016/0255447 A1 9/2016 Kim et al.
2017/0277257 A1* 9/2017 Ota ......................... G06F 3/013

OTHER PUBLICATIONS

International Search Report and Written Opinion for PCT/IB2018/050354, dated May 1, 2018.

* cited by examiner

ADVANCED ARTIFICIAL SOUND HEARING TRAINING

BACKGROUND

Hearing loss, which may be due to many different causes, is generally of two types: conductive and sensorineural. Sensorineural hearing loss is due to the absence or destruction of the hair cells in the cochlea that transduce sound signals into nerve impulses. Various hearing prostheses are commercially available to provide individuals suffering from sensorineural hearing loss with the ability to perceive sound. One example of a hearing prosthesis is a cochlear implant.

Conductive hearing loss occurs when the normal mechanical pathways that provide sound to hair cells in the cochlea are impeded, for example, by damage to the ossicular chain or the ear canal. Individuals suffering from conductive hearing loss may retain some form of residual hearing because the hair cells in the cochlea may remain undamaged.

Individuals suffering from hearing loss typically receive an acoustic hearing aid. Conventional hearing aids rely on principles of air conduction to transmit acoustic signals to the cochlea. In particular, a hearing aid typically uses an arrangement positioned in the recipient's ear canal or on the outer ear to amplify a sound received by the outer ear of the recipient. This amplified sound reaches the cochlea causing motion of the perilymph and stimulation of the auditory nerve. Cases of conductive hearing loss typically are treated by means of bone conduction hearing aids. In contrast to conventional hearing aids, these devices use a mechanical actuator that is coupled to the skull bone to apply the amplified sound.

In contrast to hearing aids, which rely primarily on the principles of air conduction, certain types of hearing prostheses commonly referred to as cochlear implants convert a received sound into electrical stimulation. The electrical stimulation is applied to the cochlea, which results in the perception of the received sound.

Many devices, such as medical devices that interface with a recipient, have structural and/or functional features where there is utilitarian value in adjusting such features for an individual recipient. The process by which a device that interfaces with or otherwise is used by the recipient is tailored or customized or otherwise adjusted for the specific needs or specific wants or specific characteristics of the recipient is commonly referred to as fitting. One type of medical device where there is utilitarian value in fitting such to an individual recipient is the above-noted cochlear implant. That said, other types of medical devices, such as other types of hearing prostheses, exist where there is utilitarian value in fitting such to the recipient.

Moreover, even with a fitted cochlear implant, the nature of electric hearing is such that the ultimate hearing percept based on electric hearing can often be different from that which a normal hearing person would perceive.

SUMMARY

In accordance with an exemplary embodiment, there is a method, comprising: obtaining access to a virtual reality system; activating a cochlear implant such that the cochlear implant evokes a hearing percept based on first input; and receiving second input from the virtual reality system in temporal proximity with the evocation of the hearing percept based on the first input, wherein the cochlear implant evokes a hearing percept based on the first input, and the second input is correlated with the first input.

In accordance with another exemplary embodiment, there is system, comprising: a virtual reality sub-system; and a hearing prosthesis, wherein the virtual reality sub-system is configured to provide first output to the hearing prosthesis, the hearing prosthesis is configured to evoke a hearing percept in a recipient thereof based on the first output, the virtual reality sub-system is configured to simultaneously provide second output to the recipient of the hearing prosthesis to evoke a second sensation different from hearing, and the second sensation is a sensation that results from the real-life physical phenomenon that results in the hearing percept.

In accordance with another exemplary embodiment, there is a method, comprising: a first action of evoking an artificial hearing percept in a recipient of a hearing prosthesis based on input indicative of a first sound; second action of receiving first visual input, which first visual input is correlated with the first sound, wherein the second action is executed in effective temporal correlation with the first action; and repeating the first and second actions, thereby improving the recipient's ability to recognize the first sound.

In accordance with another exemplary embodiment, there is a method, comprising: (i) providing a recipient of a cochlear implant hearing prosthesis a first sound and non-sound stimulation scenario, wherein an artificial hearing percept of the first sound is evoked with the hearing prosthesis; and (ii) providing the recipient of the hearing prosthesis a second sound and non-sound stimulation scenario wherein an artificial hearing percept of the second sound is evoked with the hearing prosthesis, wherein the non-sound stimulation is a virtual reality initiated stimulation, and the provided scenarios train or retrain the recipient to associate the respective sounds with the respective non-sound stimulation.

In accordance with another exemplary embodiment, there is a method, comprising: training or retraining a recipient of a cochlear implant to recognize and/or distinguish sounds using virtual reality.

BRIEF DESCRIPTION OF THE DRAWINGS

Embodiments are described below with reference to the attached drawings, in which, with respect to the figures.

DETAILED DESCRIPTION

Figure 1:
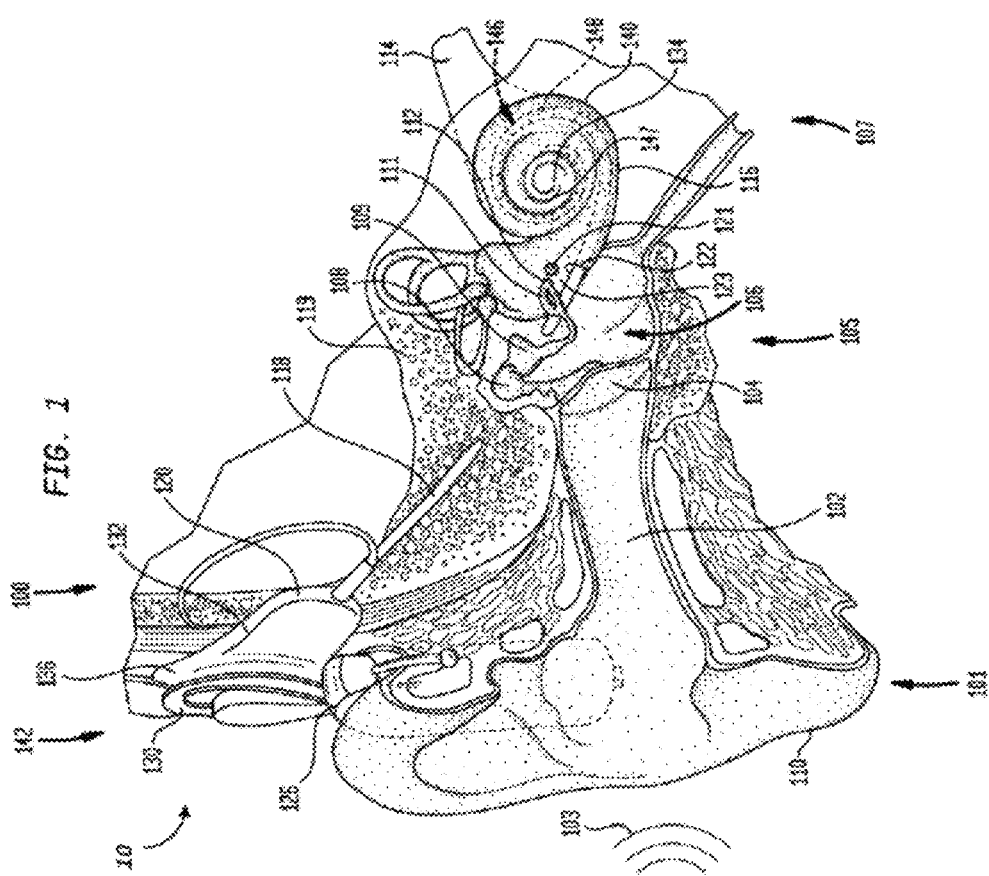
FIG. 1 is a perspective view of an exemplary hearing prosthesis in which at least some of the teachings detailed herein are applicable.

FIG. 1 is a perspective view of a cochlear implant, referred to as cochlear implant 100, implanted in a recipient, to which some embodiments detailed herein and/or variations thereof are applicable. The cochlear implant 100 is part of a system 10 that can include external components in some embodiments, as will be detailed below. It is noted that the teachings detailed herein are applicable, in at least some embodiments, to partially implantable and/or totally implantable cochlear implants (i.e., with regard to the latter, such as those having an implanted microphone). It is further noted that the teachings detailed herein are also applicable to other stimulating devices that utilize an electrical current beyond cochlear implants (e.g., auditory brain stimulators, pacemakers, etc.). Also, the teachings detailed herein are also applicable to other hearing prostheses, as will be detailed below.

The recipient has an outer ear 101, a middle ear 105, and an inner ear 107. Components of outer ear 101, middle ear 105, and inner ear 107 are described below, followed by a description of cochlear implant 100.

In a fully functional ear, outer ear 101 comprises an auricle 110 and an ear canal 102. An acoustic pressure or sound wave 103 is collected by auricle 110 and channeled into and through ear canal 102. Disposed across the distal end of ear channel 102 is a tympanic membrane 104 which vibrates in response to sound wave 103. This vibration is coupled to oval window or fenestra ovalis 112 through three bones of middle ear 105, collectively referred to as the ossicles 106 and comprising the malleus 108, the incus 109, and the stapes 111. Bones 108, 109, and 111 of middle ear 105 serve to filter and amplify sound wave 103, causing oval window 112 to articulate, or vibrate in response to vibration of tympanic membrane 104. This vibration sets up waves of fluid motion of the perilymph within cochlea 140. Such fluid motion, in turn, activates tiny hair cells (not shown) inside of cochlea 140. Activation of the hair cells causes appropriate nerve impulses to be generated and transferred through the spiral ganglion cells (not shown) and auditory nerve 114 to the brain (also not shown) where they are perceived as sound.

As shown, cochlear implant 100 comprises one or more components which are temporarily or permanently implanted in the recipient. Cochlear implant 100 is shown in FIG. 1 with an external device 142, that is part of system 10 (along with cochlear implant 100), which, as described below, is configured to provide power to the cochlear implant, where the implanted cochlear implant includes a battery that is recharged by the power provided from the external device 142.

In the illustrative arrangement of FIG. 1, external device 142 can comprise a power source (not shown) disposed in a Behind-The-Ear (BTE) unit 126. External device 142 also includes components of a transcutaneous energy transfer link, referred to as an external energy transfer assembly. The transcutaneous energy transfer link is used to transfer power and/or data to cochlear implant 100. Various types of energy transfer, such as infrared (IR), electromagnetic, capacitive and inductive transfer, may be used to transfer the power and/or data from external device 142 to cochlear implant 100. In the illustrative embodiments of FIG. 1, the external energy transfer assembly comprises an external coil 130 that forms part of an inductive radio frequency (RF) communication link. External coil 130 is typically a wire antenna coil comprised of multiple turns of electrically insulated single-strand/or multi-strand platinum or gold wire. External device 142 also includes a magnet (not shown) positioned within the turns of wire of external coil 130. It should be appreciated that the external device shown in FIG. 1 is merely illustrative, and other external devices may be used with embodiments of the present invention.

Cochlear implant 100 comprises an internal energy transfer assembly 132 which can be positioned in a recess of the temporal bone adjacent auricle 110 of the recipient. As detailed below, internal energy transfer assembly 132 is a component of the transcutaneous energy transfer link and receives power and/or data from external device 142. In the illustrative embodiment, the energy transfer link comprises an inductive RF link, and internal energy transfer assembly 132 comprises a primary internal coil 136. Internal coil 136 is typically a wire antenna coil comprised of multiple turns of electrically insulated single-strand/or multi-strand platinum or gold wire.

Cochlear implant 100 further comprises a main implantable component 120 and an elongate electrode assembly 118. In some embodiments, internal energy transfer assembly 132 and main implantable component 120 are hermetically sealed within a biocompatible housing. In some embodiments, main implantable component 120 includes an implantable microphone assembly (not shown) and a sound processing unit (not shown) to convert the sound signals received by the implantable microphone in internal energy transfer assembly 132 to data signals. That said, in some alternative embodiments, the implantable microphone assembly can be located in a separate implantable component (e.g., that has its own housing assembly, etc.) that is in signal communication with the main implantable component 120 (e.g., via leads or the like between the separate implantable component and the main implantable component 120). In at least some embodiments, the teachings detailed herein and/or variations thereof can be utilized with any type of implantable microphone arrangement.

Main implantable component 120 further includes a stimulator unit (also not shown) which generates electrical stimulation signals based on the data signals. The electrical stimulation signals are delivered to the recipient via elongate electrode assembly 118.

Elongate electrode assembly 118 has a proximal end connected to main implantable component 120, and a distal end implanted in cochlea 140. Electrode assembly 118 extends from main implantable component 120 to cochlea 140 through mastoid bone 119. In some embodiments electrode assembly 118 may be implanted at least in basal region 116, and sometimes further. For example, electrode assembly 118 may extend towards apical end of cochlea 140, referred to as cochlea apex 134. In certain circumstances, electrode assembly 118 may be inserted into cochlea 140 via a cochleostomy 122. In other circumstances, a cochleostomy may be formed through round window 121, oval window 112, the promontory 123, or through an apical turn 147 of cochlea 140.

Electrode assembly 118 comprises a longitudinally aligned and distally extending array 146 of electrodes 148, disposed along a length thereof. As noted, a stimulator unit generates stimulation signals which are applied by electrodes 148 to cochlea 140, thereby stimulating auditory nerve 114.

In an exemplary embodiment, subsequent implantation of the cochlear implant 100, the recipient can have the cochlear implant 100 fitted or customized to conform to the specific recipient desires/to have a configuration (e.g., by way of programming) that is more utilitarian than might otherwise be the case. Also, in an exemplary embodiment, methods can be executed with the cochlear implant 100, before and/or after it is fitted or customized to conform to the specific recipient desire, so as to alter (e.g., improve) the recipient's ability to hear with the cochlear implant 100 and/or so as to change an efficacy of the implanted cochlear implant 100 (e.g., improve). Some exemplary procedures along these lines are detailed below. These procedures are detailed in terms of a cochlear implant by way of example. It is noted that the below procedure is applicable, albeit perhaps in more general terms, to other types of hearing prosthesis, such as by way of example only and not by way of limitation, bone conduction devices (active transcutaneous bone conduction devices, passive transcutaneous bone conduction devices, percutaneous bone conduction devices), direct acoustic cochlear implants, sometimes referred to as middle-ear-implants, etc. Also, the below procedures can be applicable, again albeit perhaps in more general terms, to other types of devices that are used by a recipient, whether they be prosthetic or otherwise.

The cochlear implant 100 is, in an exemplary embodiment, an implant that enables a wide variety of fitting options and training options that can be customized for an individual recipient.

Some exemplary embodiments are directed towards reducing the amount of time and/or effort the brain of a recipient of a cochlear implant requires to adapt to electric hearing, all other things being equal. By all other things being equal, it is meant that for the exact same settings (e.g., map settings, volume settings, balance settings, etc.) and for the exact same implant operating at the exact same efficiency, for the exact same person. That is, the only variable is the presence or absence of the introduction of the method detailed herein and/or the application of the systems detailed herein. In this regard, it is been found that cochlear implant recipients perceive sound differently from that of a normal hearing person. In at least some exemplary scenarios, this is because a cochlear implant's sound perception mechanism is different from a normal hearing person (electric hearing/direct electric stimulation of the cochlea as opposed to the normal waves of fluid stimulating the cilia of the cochlea).

Some exemplary embodiments are directed towards reducing the amount of time and/or effort the brain of a recipient of a cochlear implant requires to relearn how to hear utilizing the new pathway resulting from electric hearing, all other things being equal. Still further, some exemplary embodiments are directed towards improving the confidence that the recipient has with respect to properly identifying sounds that are based on electric hearing. Other utilitarian features can result from the methods and systems detailed herein as well, such as, by way of example only and not by way of limitation, the ability to correctly identify different origins of respective similar sounds, all other things being equal.

Some exemplary embodiments of the teachings detailed herein address, in some instances, the unique challenges faced by cochlear implant recipients vis-à-vis rehabilitation relative to that which is the case for a normal/traditional hearing aid recipient. Embodiments detailed herein, including the methods and systems, are all applicable to training the recipient with respect to object association, training the recipient to understand reverberation and its effects one sound perception, train the recipient to develop sound localization, and train the recipient to appreciate finer intonations of speech. That said, embodiments of the teachings detailed herein can also be applicable to cochlear implant recipients who are being rehabilitated in that they have never experienced normal hearing prior to receiving a cochlear implant.

Some embodiments of the teachings detailed herein utilized virtual reality, although in other embodiments, such is not necessarily the case, and instead, traditional media/multimedia devices can be utilized. In an exemplary embodiment, the recipient can be immersed in a world, which can be a three-dimensional world, which can represent a real or fantasy world, where objects that produce sounds of the real world are presented to the recipient in a visual manner. For example, in an exemplary embodiment, there could be a visual image of a car, a lawnmower, any fan, each of which has a motor but produces different sounds which might confuse a cochlear implant recipient with respect to discrimination without training to identify the differences in the sound.

Figure 2:
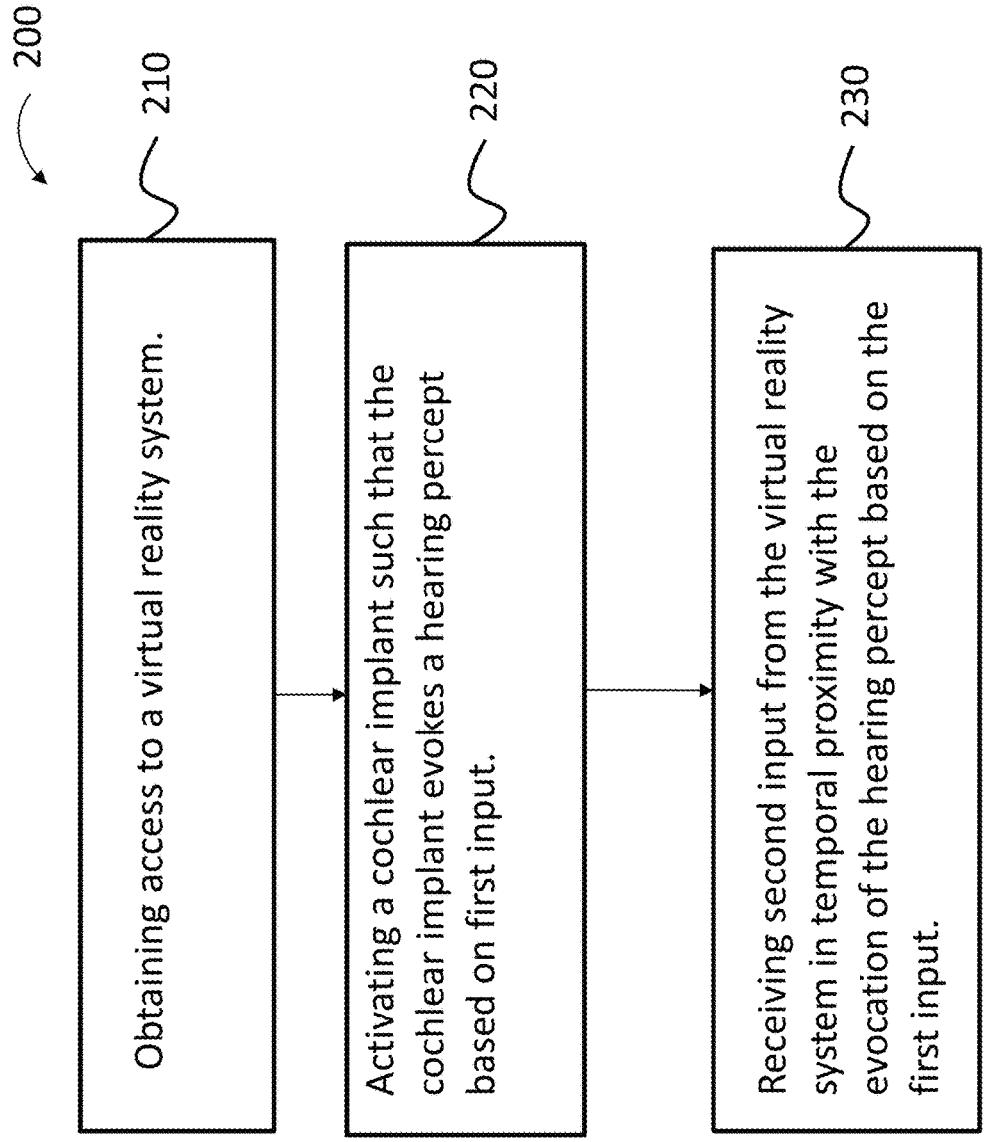
FIGS. 2-9 present additional exemplary flowcharts for an exemplary method according to an exemplary embodiment.

FIG. 2 presents an exemplary flowchart for an exemplary method, method 200. Method 200 results in, in some embodiments, the above utilitarian features vis-à-vis the reduction of time and/or effort applied by the brain. That said, in at least some exemplary embodiments, method 200 does not result in the reduction of time and/or effort, but instead results in other phenomena, such as increased confidence, increased/improved ability to correctly identify different origins of respective similar sounds, etc. Method 200 can result in other utilitarian value as well.

Method 200 includes method action 210, which includes obtaining access to a virtual reality system. Some additional details of the virtual reality system will be described below. Briefly, however, in an exemplary embodiment, the virtual reality system is configured to provide output representative of sound to the cochlear implant (via any medium that can have utilitarian value, such as by way of example only and not by way of limitation, air conduction from a speaker, electric signals via a hard wire, infrared, etc.). Still further, in some exemplary embodiments, the virtual reality system is configured to provide output representative of visual images (which include moving images (video)). Method 200 further includes method action 220, which includes activating a cochlear implant such that the cochlear implant evokes a hearing percept based on first input. In an exemplary embodiment, the first input is the aforementioned sound output from the virtual reality system. That said, in some alternate embodiments, the first input can originate from other origins. Any input that can enable the teachings detailed herein and/or variations thereof to be practiced can be utilized in at least some exemplary embodiments. Method action 230 further includes receiving second input from the virtual reality system in temporal proximity with the evocation of the hearing percept based on the first input. In an exemplary embodiment, this second input is the output in the form of images from the virtual reality system. It is noted that temporal proximity includes receiving the first input at the same time that the second input is received, receiving the first input before the second input is received, and/or receiving the first input after the second input is received. In an exemplary embodiment, the temporal proximities detailed herein is/are a period of X seconds or less before or after the activation of the cochlear implant of method 220. In an exemplary embodiment, X is 15 seconds, 14, 13, 12, 11, 10, 9, 8, 7, 6, 5, 4, 3, 2 or 1, 0.75, 0.5, 0.25 or 0 seconds, measured from the beginning, middle, or end of the activation of the cochlear implant of method action 220.

It is noted that while the flowchart presents method action 220 as occurring before method action 230, in an alternate embodiment, method action 230 occurs before method action 220. In this regard, it is noted that the nomenclature "first input," "second input," etc., is not representative of temporal primacy, but instead represents a numeric identifier, nothing more (unless otherwise indicated). Accordingly, in an exemplary embodiment, the visual cue is first presented, followed by the audio signal. Such can have utilitarian value with respect to people who hear sounds from far distance, where an action will be seen prior to hearing the results of that action. By way of example only and not by way of limitation, a demolitions expert might be exposed to a second input corresponding to the visual detonation of a stick of dynamite, followed by a first input corresponding to the sound of the detonation of the stick of dynamite.

In the method of FIG. 2 (method 200), the cochlear implant evokes a hearing percept based on the first input, and the second input is correlated with the first input. In this regard, by way of example only and not by way of limitation, if the first input is a sound signal based on the sound of a push gasoline powered six horsepower lawnmower, the second input will be based on a lawnmower, and thus the first input and the second input are correlated with each other. In an exemplary embodiment, the second input can be visual input of a lawnmower (whether it be a picture, a video, etc., and the picture and video can be that of an artist's cartoon (including stick figure) or an exact image (actual image, computer generated image)—any image that can have utilitarian value can be utilized in at least some exemplary embodiments, providing that such image is correlated to the first input.

It is noted that in an exemplary embodiment of method 200, the first input can be generated by the virtual reality system. In this regard, in an exemplary embodiment, the virtual reality system provides both the first input and the second input to the cochlear implant.

In an exemplary embodiment, method 200 (and in some embodiments, the other methods and/or systems detailed herein) provide assistance to the rehabilitation process for the person who has received a cochlear implant. By way of example only and not by way of limitation, the methods and/or systems detailed herein utilize as a principle of operation, object association as part of a rehabilitation and/or a habilitation journey of a cochlear implant recipient. The methods and/or systems detailed herein enable the re-association/association of perceived sounds based on electric hearing to objections and/or situations.

Figure 3:
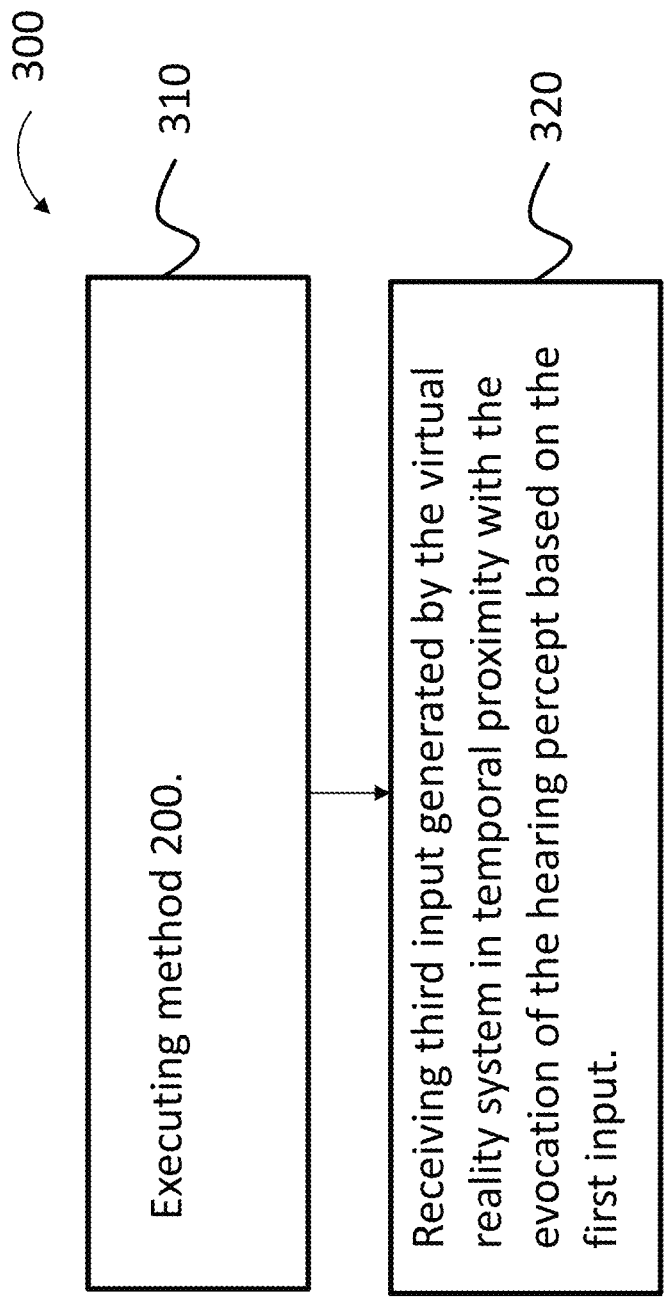

FIG. 3 represents an exemplary flowchart for an exemplary method, method 300, which includes method action 310, which includes executing method 200. Method 300 further includes method action 320, which includes receiving a third input generated by the virtual reality system in temporal proximity with the evocation of the hearing percept based on the first input. In an exemplary embodiment, the third input is a different type of input than that of the first input or the second input. In an exemplary embodiment, this third input can be a tactile input. Note that in some exemplary embodiments, the second input can be a tactile input—it is noted that while the embodiment of FIG. 3 makes clear that there can be a second input and a third input (and while not specifically represented by method 300, more than a third input), method 200 can be practiced with only a first input and a second input—thus, any input herein described in terms of method 300 is also applicable to the input utilized in method 200, and vice versa). By way of example only and not by way of limitation, the third input (or second input) can be force upon the chest representing the force from pressure waves output by a motorbike (where the first input can be based on the sound of a motorbike). Still further by way of example only and not by way of limitation, the third input (or the second input) can be wetness, where the first input is sound based on the sound of an object splashing and water. Still further by way of example only and not by way of limitation, the third input (with a second input) can be a sudden deceleration or acceleration, where the first input is based on the sound of the skidding car or the sound of an accelerating car. In an exemplary embodiment, the first input can be based on the sound of an earthquake, and the third input with a second input can be based on shaking of a room or an object.

In an exemplary embodiment, the first input can be based on sound related to a room with an open window as opposed to a closed window, and the third input or the second input can be wind. That said, in an exemplary embodiment, the first input can be based on wind sound, and the second input or the third input can be wind or otherwise based on wind. In an exemplary embodiment, the first input can be based on sound of rain, and the third input with a second input can be raindrops.

In an exemplary embodiment, this third input can be a smell input. By way of example only and not by way of limitation, in an exemplary embodiment, the first sound can be based on the sound of an aerosol being discharged from a spray can, and the third input (or second input) can be based on the smell of the aerosol. In an exemplary embodiment, the first input can be the sound of a match lighting, and the third input (or second input) can be the smell of sulfur. In an exemplary embodiment, the first input can be based on the sound of a crackling fire, and the third input with a second input can be the smell of burning wood. In an exemplary embodiment, the first input can be based on the sound of gears grinding, and the second input or the third input can be based on the smell of gears grinding.

Figure 4:
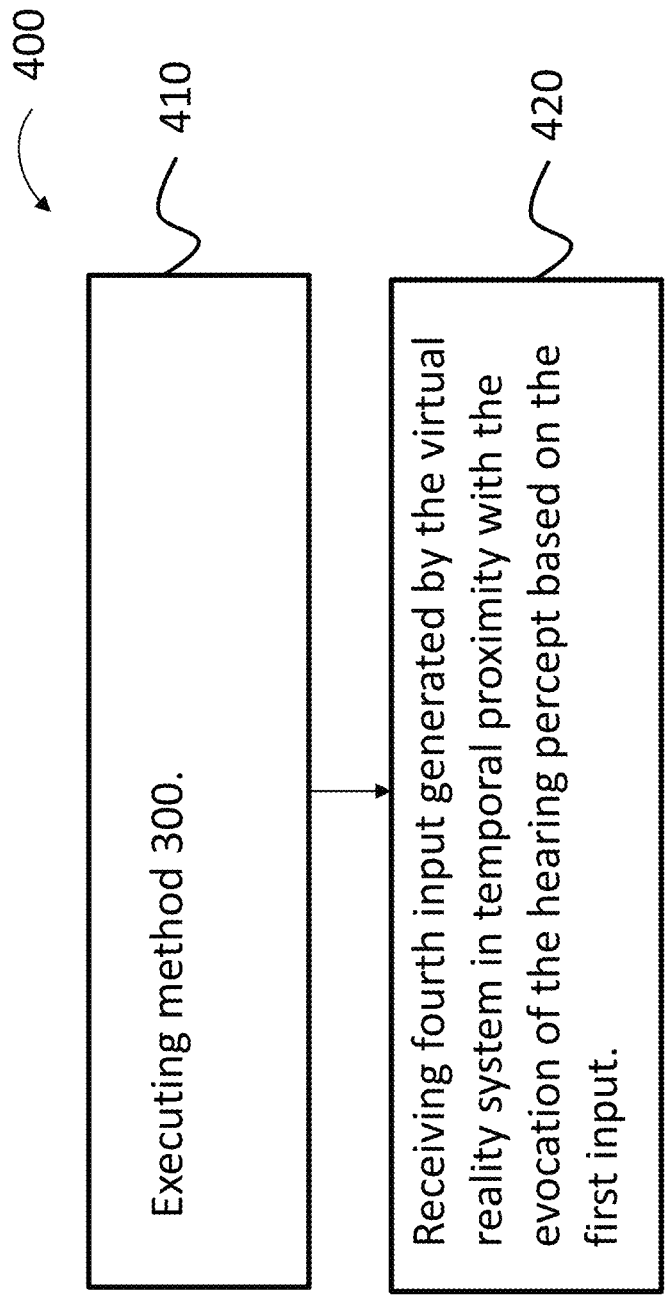

Note that in an exemplary embodiment, there can be a fourth input as well. FIG. 4 represents an exemplary flowchart for an exemplary method, method 400, which includes method action 410, which includes executing method 300. Method 400 further includes method action 420, which includes receiving a fourth input generated by the virtual reality system in temporal proximity with the evocation of the hearing percept based on the first input. In an exemplary embodiment, the fourth input is a different type of input than that of the first input or the second input or the third input. In an exemplary embodiment, this third input can be a tactile, and the fourth input can be smell.

Figure 5:
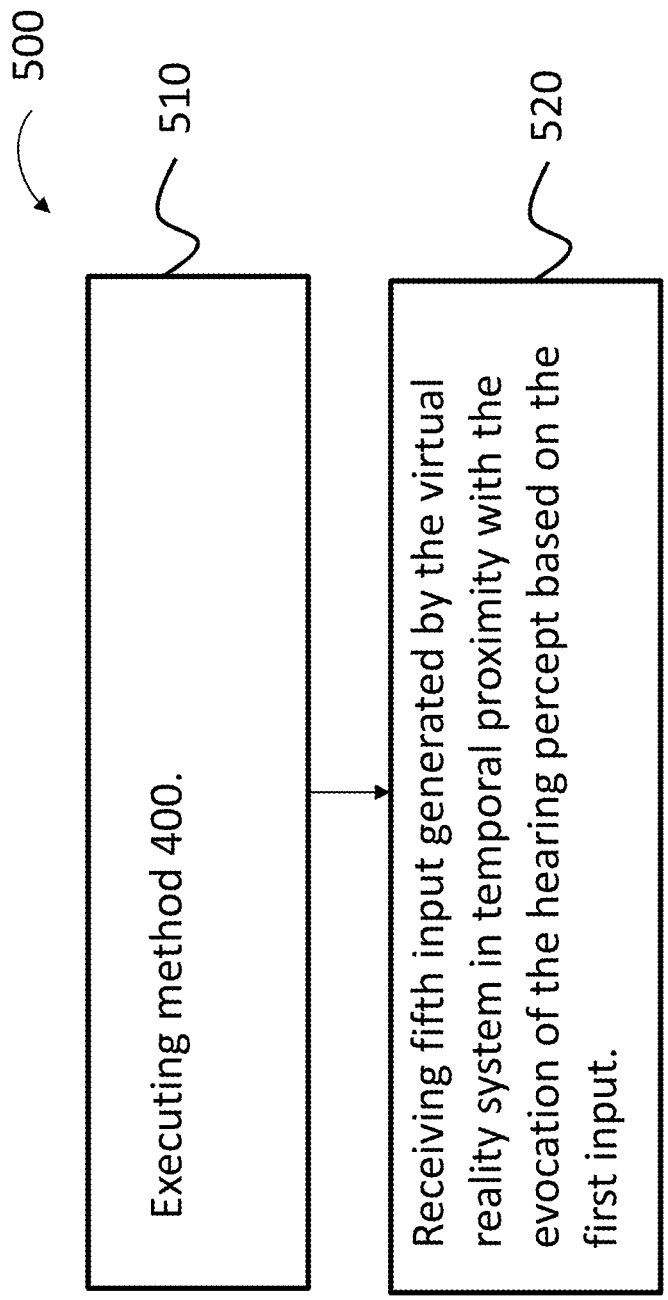

Note that in an exemplary embodiment, there can be a fifth input as well. FIG. 5 represents an exemplary flowchart for an exemplary method, method 500, which includes method action 510, which includes executing method 400. Method 500 further includes method action 520, which includes receiving fourth input generated by the virtual reality system in temporal proximity with the evocation of the hearing percept based on the first input. In an exemplary embodiment, the fourth input is a different type of input than that of the first input or the second input or the third input. In an exemplary embodiment, this third input can be a tactile, the fourth input can be smell, the fifth input can be taste.

Note that method 200 is not mutually exclusive for method 300, method 400, or method 500. In this regard, execution of method 300, for example, also results in the execution of method 200, because method 200 is not limited to just a first and second input—method 200 simply requires at least a first and second input. Accordingly, method 500 is not limited to only five inputs, and thus in an exemplary embodiment, there are methods that have six, seven, eight, nine, or 10 inputs or more. Any number of inputs that can be utilized to enable the teachings detailed herein and/or variations thereof can be utilized in at least some exemplary embodiments to practice at least some exemplary embodiments.

It is noted that the second input of any of the above embodiments can be visual, tactile, smell, or taste based; the third input can be one of the three remaining visual, tactile, smell, or taste based inputs (the three not used as the second input); the fourth input can be one of the two remaining visual, tactile, smell, or taste based inputs (the two not used as the second input and the third input); and the fifth input can be one of the one remaining visual, tactile, smell, or taste based inputs (the one not used as the second input, the third input and the fourth input).

At least some exemplary embodiments of the methods and systems detailed herein have utilitarian value with respect to providing a virtual reality system which is configured to provide audio and visual cues to a recipient of a cochlear implant (although again, it is noted that in some alternate embodiments, the virtual reality system may not necessarily provide visual cues to the recipient, but instead can provide other sensory cues which can have utilitarian value with respect to a scenario where the recipient is blind). In at least some exemplary embodiments, the systems and methods detailed herein are provided so as to render situations involving object association—providing sounds that are associated with objects (although it is noted that the teachings detailed herein are not limited to objects—the teachings detailed herein can also provide scenario association (e.g., the sound of rain, the sound of the same objection in different environments—more on this below). Generically, the phrase "events" will be utilized to encompass the sounds of an object being utilized (e.g., a motorbike being operated) and the sounds of a given scenario (a rain storm, a thunderstorm, etc.). Additional situations involving other types of association will be described in greater detail below. For the moment, object association is addressed.

A recipient of a cochlear implant may have difficulty distinguishing between a motorbike, a lawnmower, or a leaf blower. In an exemplary embodiment, the recipient is someone who's favorite sounds when he or she had normal hearing were the sounds of a switchblade and a motorbike, but, after having a cochlear implant implanted in the recipient, the recipient can no longer distinguish between a motorbike, a lawnmower or a leaf blower, or at least not distinguish between the two or three out of the three without some uncertainty. Such can also be the case with respect to a sound of a ticket punch versus the sound of a switchblade. In an exemplary embodiment, the recipient is someone who had an unpleasant experience with a switchblade, but who also travels on trains where the sound of the ticket being punched reminds him or her of the bad experience. In any event, in at least some exemplary embodiments of method 200, the first input is representative of an event species of a genus of events, and the second input is representative of the event species. For example, the genus of events entails the operation of an internal combustion engine at ground-level, and the species of the event corresponds to the specific internal combustion engine at issue (e.g., the motorbike). In this regard, the first input would be the sound of a motorbike, and the second input would be representative of a motorbike (e.g., visual image thereof, the smell of two-stoke exhaust, the beating on the chest from the muffler, etc.).

Figure 6:
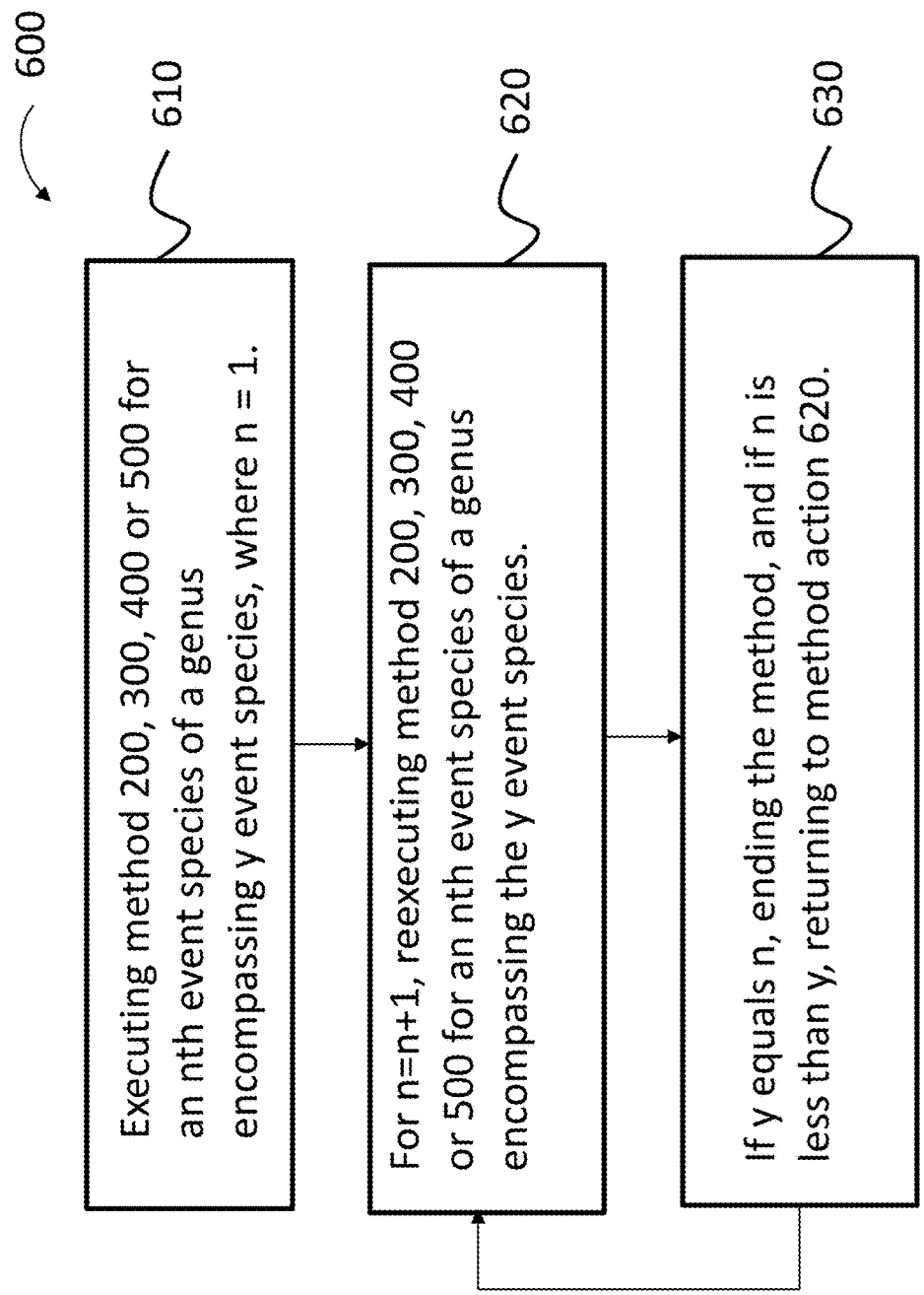

In an exemplary embodiment, the methods detailed herein and the system detailed herein can provide a regime of habilitation and/or rehabilitation such that the recipient learns the differences between sounds of different species events of a genus event. In an exemplary embodiment of practicing method 200, method 200 can first be practiced with the first input based on the sound of a motorbike, and the second input based on the image of a motorbike. Then, method 200 can be re-executed with the first input based on the sound of a leaf blower, and the second input based on the image of a leaf blower. Then, method 200 can be re-executed with the first input based on the sound of a lawnmower, and the second input based on the image of a lawnmower, and so on. In this way, a method can be provided so as to habilitate and/or rehabilitate the recipient to recognize the differences between different sounds of the respective event species in a manner that would otherwise not be the case without the teachings detailed herein, all other things being equal. To this end, FIG. 6 presents a flowchart for an exemplary method, method 600, which includes method action 610. Method action 610 includes executing method 200, method 300, method 400, or method 500 for an nth event species of a genus encompassing y event species, where n=1. In an exemplary embodiment, method action 610 includes executing method 200, and y=3 (a motorbike, a lawnmower and a leaf blower). Thus, method action 610 can include a first input corresponding to a sound of a motorbike, and a second input corresponding to a picture of the motorbike. Method 600 further includes method action 620, which includes, for n=n+1, re-executing method 200, method 300, method 400, or method 500 for an nth events species of a genus encompassing the y events. Here, for the first implementation of method action 620, n=2 (1+1), and the first input can correspond to the sound of a lawnmower and the second input can correspond to a picture of a lawnmower. Method 600 then proceeds to method action 630, which includes evaluating whether y=n, and if y equals n, ending the method. Here, y=3 and n=2, so the method does not yet end instead, because n is less than y, the method returns back to method action 620, where n now equals 3 (2+1), and method 200 is re-executed for a third event species, the leaf blower, and the first input is sound of the leaf blower and the second input is an image of the leaf blower. The method then returns to method action 630, and now because y=n, the method is completed.

It is noted that the embodiments of FIG. 6 can be executed in a serial manner for each individual event species, one at a time, whereas in some alternate embodiments, for example, the respective sub-methods (method 200, 300, 400, or 500) can be executed repeatedly for a given event species before moving on to the next method action for the next event species. Note also, in some embodiments, a given method action can be repeated more times for some sounds than others. By way of example only and not by way of limitation, there can be utilitarian value with respect to presenting a first sound species a limited number of times relative to the presentation of a second sound species. For example, if the sound of the leaf blower is a sound that will not occur frequently relative to the sound of a motorbike and the sound of a lawnmower, those two latter sounds will be applied more frequently in method 600 than the sound of the leaf blower. Indeed, the sound of the leaf blower may be intermittently introduced so as to provide a control or a slight variation that can further train the recipient to identify the different sounds. Any quantity or quality of first input and second input that can be provided to the recipients in any order that can enable the teachings detailed herein to have utilitarian value with respect to training the recipient to better recognize or better distinguish between sounds can be utilized in at least some exemplary embodiments.

In this way (by executing method 600), by way of example, the teachings detailed herein can be used to better familiarize a recipient with certain specific species of sounds in a genus of sounds that might not be easily distinguishable from each other (including not distinguishable from each other), easily recognizable (including not recognizable), relative to that which would be the case without executing method 600, all other things being equal. The idea is that certain sounds can be provided to the recipient with other sensory cues, such as visual cues, on a repeated basis, and thus such will train the recipient to distinguish between the different sounds, or otherwise recognize the sounds. In an exemplary embodiment, the methods and systems detailed herein induce plasticity into the brain specifically and in the recipient's neural system in general, thus improving the recipient's ability to distinguish and/or recognize the sounds.

Figure 7:
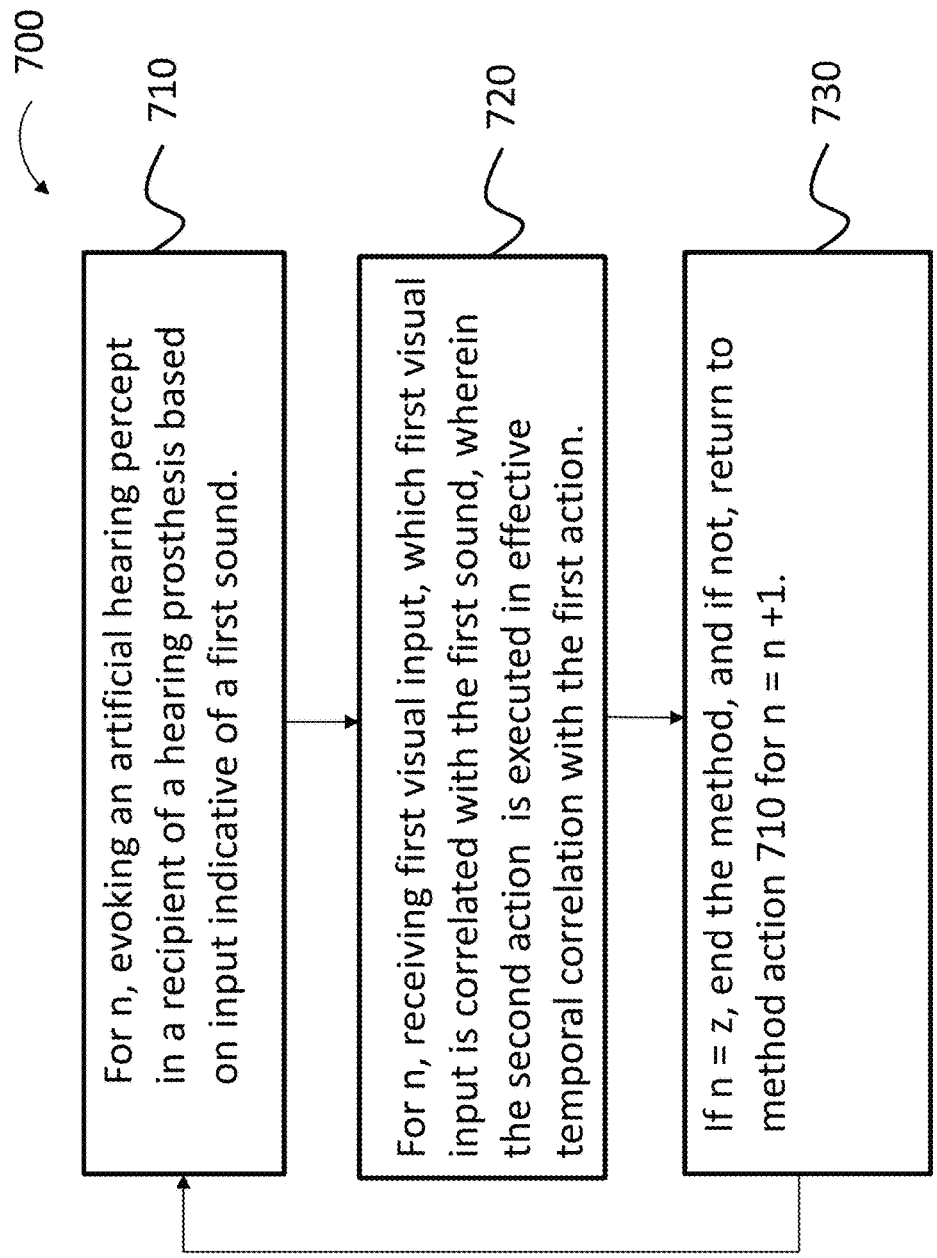

FIG. 7 presents another flowchart representing an exemplary method, here, method 700. Method 700 includes method action 710, which includes, for n, evoking an artificial hearing percept in a recipient of a hearing prosthesis based on input indicative of a first sound. Method 700 further includes method action 720, which includes receiving first visual input, which first visual input is correlated with the first sound, wherein method action 720 is executed in effective temporal correlation with method action 710. By way of example only and not by way of limitation, any temporal correlation that can have efficacy to the treatments detailed herein and variations thereof so as to improve the recipient's ability to recognize or distinguish between sounds can be utilized to practice method 700. In an exemplary embodiment, method actions 710 and 720 are executed simultaneously. In an exemplary embodiment, method action 710 and method action 720 are executed serially, and in some embodiments in temporal proximity, providing that such temporal proximity has efficacy.

Method 700 further includes method action 730, which includes determining the value of n and comparing it to a value z. If n=z, the method is completed, and if not, the method returns to method action 710 for n=n+1, and method actions 710, 720, and 730 are repeated until n=z. In an exemplary embodiment, this results in the repetition of the first and second actions a sufficient number of times to improve the recipient's ability to recognize the first sound. In an exemplary embodiment, z=2, 3, 4, 5, 6, 7, 8, 9, 10, 12, 14, 16, 18, 20, 25, 30, 35, 40, 50, 60, 70, 80, 90, or 100 or more, or any value or range of values therebetween in increments of 1 (e.g., 13-21, 33, 34, 44, etc.). Method 700 differs from method 600, by way of example, in that a virtual reality system is not required to be used per se (but not prevented from being used). Also, the artificial hearing percept can be implemented by any artificial hearing device, and not just a cochlear implant. Thus, in an exemplary embodiment, method 700 can be executed utilizing a television or a computer displayed image, etc., or a more sophisticated virtual-reality system.

In an exemplary embodiment, the first visual image of method action 710 originates from an artificial source (e.g., from a television, or a computer monitor, etc.). Consistent with the teachings detailed herein, the first visual input can be generated by a virtual-reality system, although as noted above, in alternate embodiments, the first input can be generated by a non-virtual-reality system, such as a generic television or a generic computer monitor.

It is briefly noted that in at least some exemplary embodiments, the first visual input can represent a moving object, while in other embodiments, the first visual input can represent a static object. By way of example only and not by way of limitation, it is known that objects that are moving can make different sounds than objects that are static. The well-known change in pitch of the police siren as the siren moves towards or away from an object is but one example. The teachings detailed herein can be applied to train a recipient of a hearing prosthesis to better recognize or otherwise better differentiate between sound of static objects and sounds of moving objects. Still further, the teachings detailed herein can be applied to train a recipient to better recognize sounds that emanate from an object moving towards the recipient and sounds that emanate from an object moving away from the recipient.

It is briefly noted that any disclosure herein of training a recipient to better recognize sounds also corresponds to a disclosure of training a recipient to better distinguish the sounds from other sounds (such as other sounds within the sound genus), and vice versa.

Figure 8:
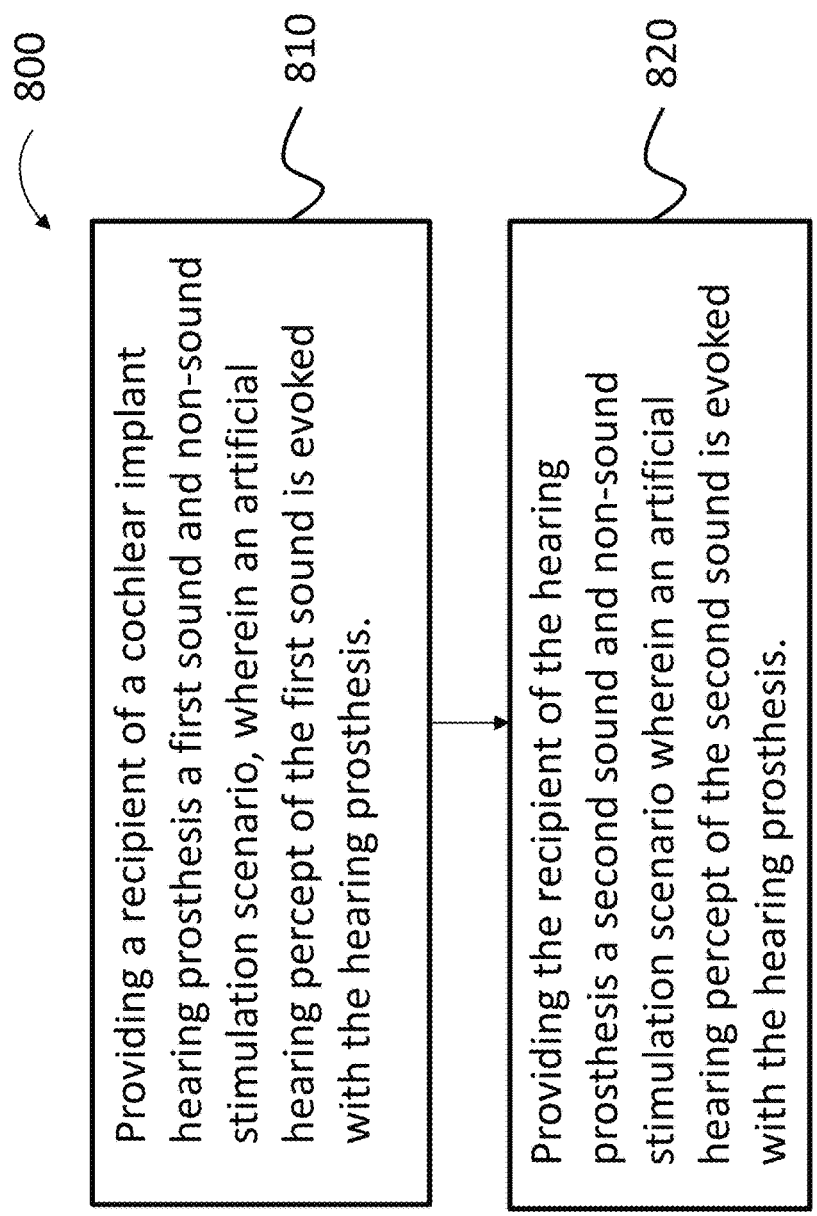

FIG. 8 provides another flowchart for an exemplary method, method 800, which includes method action 810, which includes providing a recipient of a cochlear implant hearing prosthesis a first sound and non-sound stimulation scenario, wherein an artificial hearing percept of the first sound is evoked with the hearing prosthesis. Method 800 further includes method action 820, which includes providing the recipient of the hearing prosthesis a second sound and non-sound stimulation scenario wherein an artificial hearing percept of the second sound is evoked with the hearing prosthesis. In this method, the non-sound stimulation is a virtual reality initiated stimulation, and the provided scenarios train or retrain the recipient to associate the respective sounds with the respective non-sound stimulation. Some additional details of this method will now be described.

In an exemplary embodiment of method 800, method action 810 and method action 820 can correspond to executing method 600 for at least y=2. Thus, in an exemplary embodiment, the first sound and the second sound are sounds that the recipient initially cannot routinely distinguish as being respectively associated with the respective non-sound stimulations. In an exemplary embodiment, the first sound can be the sound of a lawnmower, and the second sound can be the sound of a leaf blower, and the first non-sound stimulation scenario can be a visual image(s) of the lawnmower and the second non-sound stimulation scenario can be a visual image(s) of the leaf blower. Thus, in an exemplary embodiment, the first sound and the second sound can be respective sound species of a sound genus and the first non-sound stimulation and the second non-sound stimulation can be respective image species of an image genus.

According to an exemplary embodiment of executing method 800, method 810 is executed until the recipient gets familiar with a single object association (a single event association), and then the method is enhanced by presenting the recipient with multiple object audio cues with the associated visual cues. Accordingly, in an exemplary embodiment, method action 800 can be repeatedly executed independently of method action 820 until the recipient has learned to associate the first sound with the first non-sound stimulation. Further, method action 820 can be repeatedly executed in combination with method action 810 after the recipient has learned to associate the first sound with the first non-sound stimulation. Note that these two ways of executing method 800 are not mutually exclusive: method 800 could be practiced by executing method action 810 repeatedly until the recipient has learned to associate the first sound with the first non-sound stimulation, without executing method action 820, and then, after the recipient has learned to associate the first sound with the first non-sound stimulation, method action 820 can be repeatedly executed in combination with action 810. In an exemplary embodiment, this can have utilitarian value with respect to gradually introducing the recipient to a wider range of sounds that he or she would otherwise not be able to distinguish between or otherwise not be able to recognize. That is, by way of example only and not by way of limitation, in an exemplary embodiment, method action 810 is executed repeatedly until the recipient is able to identify the sound from the audio cue alone, e.g., without the accompanying non-sound stimulation scenario, and generally mastered recognition of the sound of method action 810 and then the method proceeds to method action 820, where method action 810 can also be executed at least intermittently (if not in a binary manner), such as executing method action 810 in temporal proximity with method action 820.

Figure 9:
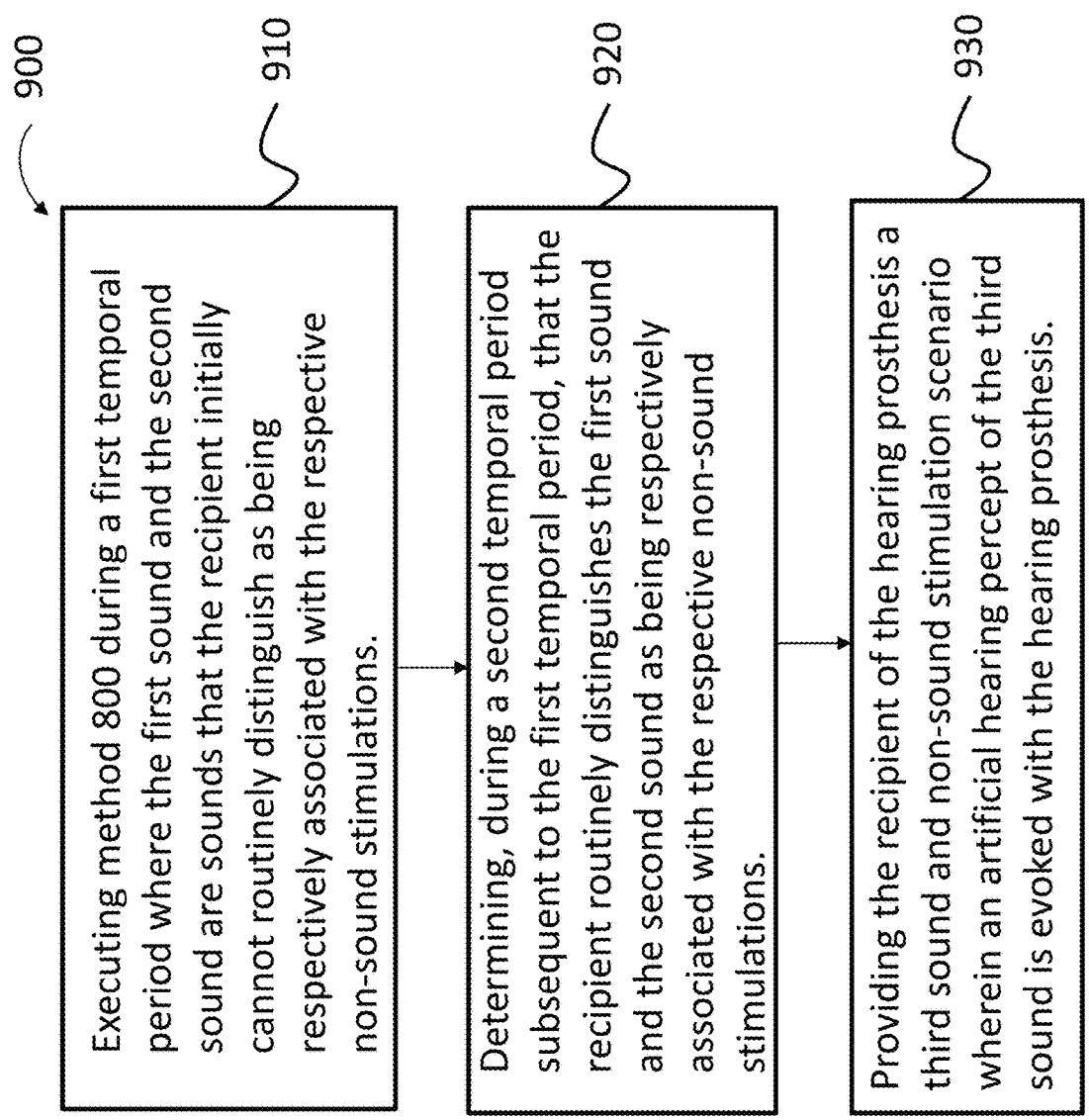

Thus, FIG. 9 presents an exemplary flowchart for an exemplary method, method 900, which includes method action 910, which includes executing method 800 during a first temporal period where the first sound and the second sound are sounds that the recipient initially cannot routinely distinguish as being respectively associated with the respective non-sound stimulations.

Figure 10:
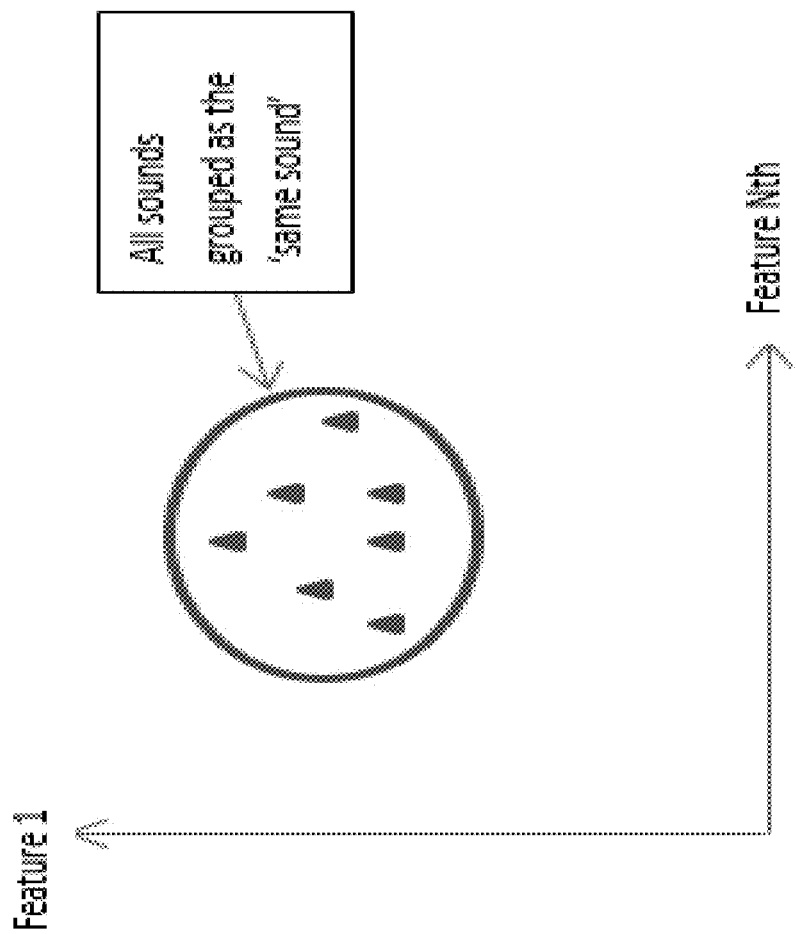
FIGS. 10-12 present a conceptual schematic representing a recipient in his or her hearing journey utilizing some of the teachings detailed herein.
Figure 11:
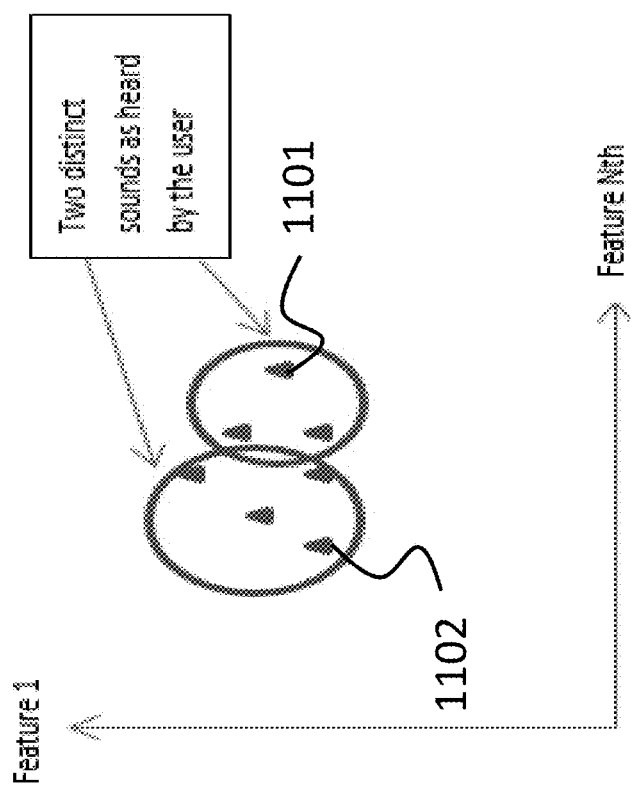
Figure 12:
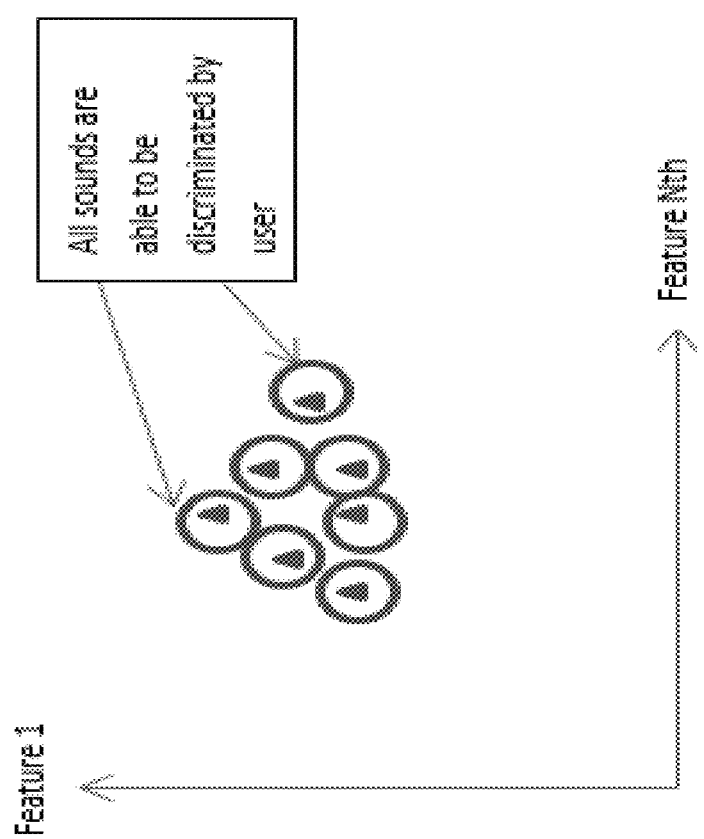

Method 900 further includes method action 920, which includes determining, during a second temporal period subsequent to the first temporal period, that the recipient routinely distinguishes the first sound and the second sound as being respectively associated with the respective non-sound stimulations. Method 900 also includes method action 930, which includes providing the recipient of the hearing prosthesis a third sound and non-sound stimulation scenario wherein an artificial hearing percept of the third sound is evoked with the hearing prosthesis. In this exemplary embodiment, the third non-sound stimulation is a virtual reality initiated stimulation, and at least one of the first sound or the second sound and the third sound are sounds that the recipient initially cannot routinely or otherwise with a degree of certainty distinguish as being respectively associated with the respective non-sound stimulations. Along these lines, FIGS. 10-12 present graphics conceptually representing a scenario of a rehabilitation/habilitation journey, where the recipient of the hearing prosthesis begins to be able to discriminate different sounds of a given sound genus. In FIG. 10, as can be seen, all sounds are grouped as the same sound by the recipient. As the recipient utilizes the teachings and methods detailed herein, over time, two distinct sounds are "heard" by the recipient (the recipient is able distinguish some sounds from other sounds in a binary manner), as is represented in FIG. 11. As the recipient continues to utilize the methods and systems detailed herein, additional sounds are distinguishable from other sounds, as represented by FIG. 12. As can be seen, the teachings and methods detailed herein can allow the recipient to better discriminate sounds as they progress in utilizing the teachings and methods detailed herein.

Note that in an exemplary embodiment, FIG. 10 can represents the baseline of the recipient. That is, whatever species of sound in a given genus of sounds is exposed to the recipient will sound the same. With respect to utilizing at least some of the systems and methods detailed herein, in an exemplary embodiment, two sound species from the genus can be chosen for "first presentation" to the recipient in the methods herein (e.g., one for method action 810 and one for method action 820). This is represented by way of example only by sounds 1101 and 1102 in FIG. 11. In an exemplary embodiment, based on subjective or objective data, these sound species can be selected based on their likelihood of having utilitarian value with respect to moving the recipient along the rehabilitation/habilitation journey relative to that which otherwise would be the case. For example, the sound of the motorbike and the sound of a leaf blower might be utilized as sounds 1101 and 1102, because the motorbike may have a deeper base sound than the leaf blower, or because the leaf blower may have a higher pitched sound than the motorbike. Also, the frequency of sound output (as opposed to the sound itself) may differ noticeably—the engine of a motorbike will not reach an RPM as high as a leaf blower within one second, and thus there will be temporal cues associated with the sounds that may make it easier for the recipient to differentiate, as opposed to, for example, a lawnmower, which may be intermediate of the two.

Consistent with the teachings above, once the recipient becomes sufficiently capable of distinguishing or otherwise recognizing between two sounds, additional sounds are introduced, such as the lawnmower.

In at least some of the exemplary embodiments detailed herein, the recipient's ability to distinguish or otherwise recognize between two or more sounds as determined utilizing recipient feedback. In at least some exemplary embodiments, the recipient can provide input to a given system indicative of what he or she believes to be the sound event. In an exemplary embodiment, this can include providing the recipient with the sound without a visual or other sensory cue. That said, in an alternative embodiment, a simulation of an environment can be provided. For example, some systems and methods detailed herein can be directed towards real-life situations as opposed to simply testing the recipient's ability (thus making it no harder than a normal hearing person in this regard). For example, depending on the sophistication of the cochlear implant or the like, input into the cochlear implant indicative of the sound of a lawnmower can be presented so as to present to the recipient the sound of the lawnmower originating from behind the recipient, thus reproducing the effect of hearing a lawnmower but not being able to see the lawnmower in a normal way. Still further, simulated nighttime or darkness conditions can be provided. The point is, the elimination of the non-hearing sensory cue can be supplemented with a presentation for why the recipient would otherwise not be able to see or otherwise sense without hearing the presence of the object making the sound. That said, in at least some exemplary embodiments, the non-hearing sensory cues will simply be removed, and the recipient will be provided the sound by itself.

With respect to feedback, as will be described in greater detail below, in an exemplary embodiment, the feedback can be actions by the recipient. For example, in the embodiments described in greater detail below relating to training a recipient to better localize sounds, the devices and systems detailed herein can be configured to detect movement of the recipient's head, such as the direction of movement of the recipient's head, in one direction or another direction, which should be indicative of the direction from which the recipient perceives a sound to be originating. In such exemplary embodiments, the system and/or device can be configured to determine whether or not the recipient has properly or correctly perceived the originating direction of the sound. Any action of the recipient that can have utilitarian value with respect to extracting data indicative of what the recipient perceives or determining performance capabilities of the recipient can be utilized in at least some exemplary embodiments.

Figure 13:
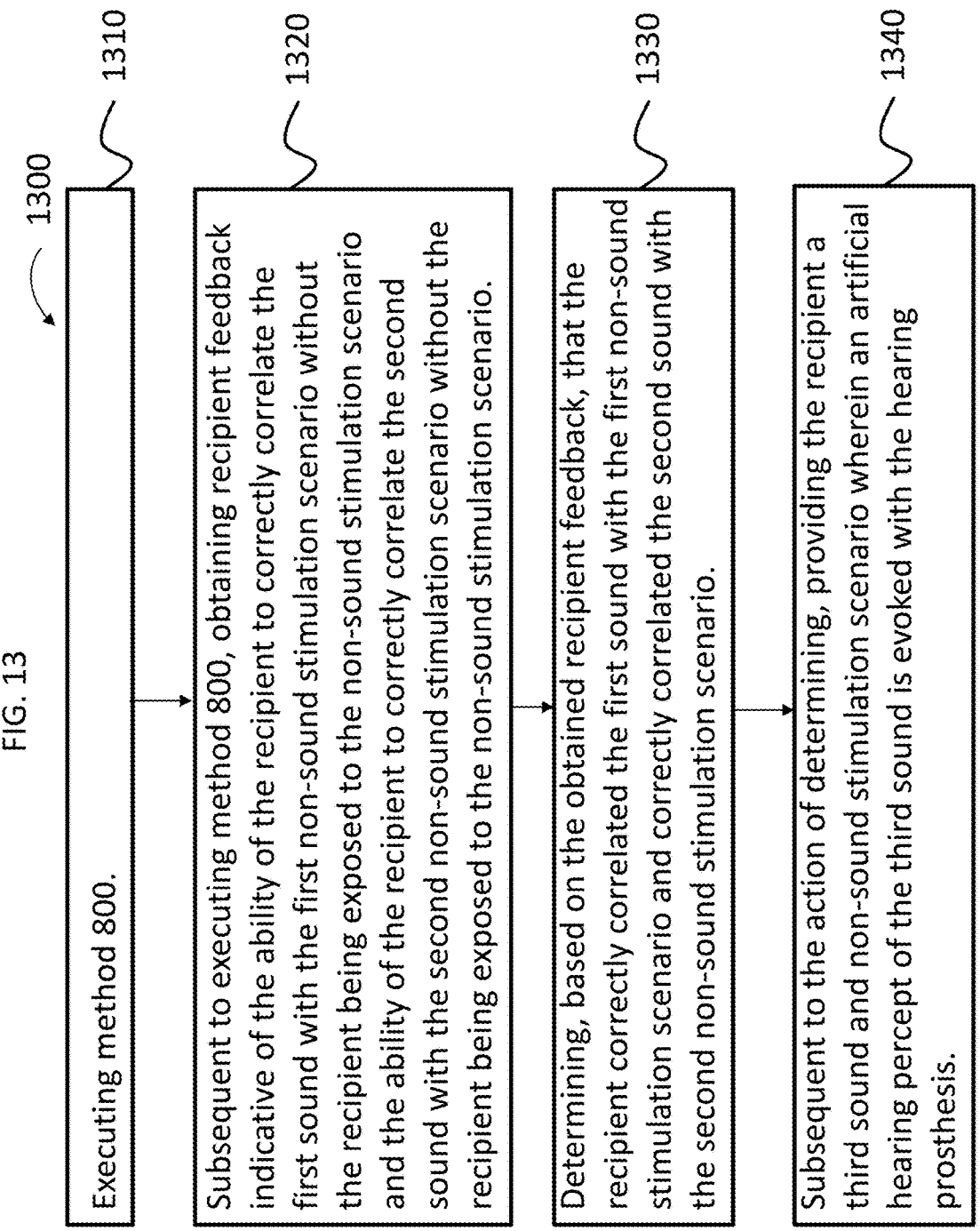
FIGS. 13-18 present additional exemplary flowcharts for an exemplary method according to an exemplary embodiment.

Accordingly, FIG. 13 presents an exemplary flowchart for an exemplary method, method 1300. Method 1300 includes method 1310, which includes executing method 800. Subsequent to method action 1310 is method action 1320, which includes obtaining recipient feedback indicative of the ability of the recipient to correctly correlate the first sound with the first non-sound stimulation scenario without the recipient being exposed to the non-sound stimulation scenario and the ability of the recipient to correctly correlate the second sound with the second non-sound stimulation scenario without the recipient being exposed to the non-sound stimulation scenario. This is testing, which can include the "blind," raw test of simply exposing the sound to the recipient in a sterile manner, and can also include the more real world scenario of removing the non-hearing stimulus but substituting an environmental condition which results in the absence of the non-hearing stimulus, which can be done by a virtual reality system.

It is noted that method action 1320 can be executed in an automated or a semi-automated fashion, or alternatively, manually by a healthcare professional or other type of test provider. By way of example only and not by way of limitation, recipient feedback can be provided via input into a computer from the recipient, whether that computer be a traditional desktop or laptop computer, or an increasingly common mobile computer, such as a smart phone or a smart watch or the like. Still further, the input need not necessarily be provided to a device that is or otherwise contains a computer. In an exemplary embodiment, the input can be provided into a conventional touchtone phone if for whatever reason such has utilitarian value. Still further, the input can be provided by the recipient checking boxes or otherwise writing down what he or she believes she hears in a manner that correlates to the given sound such that the input can be later evaluated (more on this below). Any device, system, and/or method that will enable method 1320 to be executed can be utilized in at least some exemplary embodiments.

Method 1300 further includes method 1330, which includes determining, based on the obtained recipient feedback, that the recipient correctly correlated the first sound with the first non-sound stimulation scenario and correctly correlated the second sound with the second non-sound stimulation scenario. As with method action 1330, this can be executed in an automated or semi-automated fashion, or alternatively, manually by a healthcare professional or other test giver. It is noted that method actions 1320 and 1330 can be utilized utilizing a system that includes in part a remote system, such as a remote computer that evaluates the recipient feedback. Additional details of such will be described below. In any event, any device, system, and/or method that will enable method 1330 to be executed can be utilized in at least some exemplary embodiments.

It is briefly noted that in an exemplary embodiment, method 1300 can end after method action 1330. That is, in some instances, it can be sufficient to only execute the method up to method action 1330. That said, in some instances, there is utilitarian value with respect to utilizing a more detailed method. To this end, method 1300 further includes method 1340, which includes, subsequent to the action of determining of method 1330, providing the recipient a third sound and non-sound stimulation scenario wherein an artificial hearing percept of the third sound is evoked with the hearing prosthesis. In this method, the third sound is similar to the first and/or second sound, and the third non-sound stimulation is definitively different than the first and/or second non-sound stimulation. In an exemplary embodiment the first sound can be the sound of the motorbike, the second sound can be the sound of the leaf blower, and the third sound can be the sound of the lawnmower. The first non-sound stimulation can be a video of the motorbike, the second non-sound stimulation can be a video of someone blowing leaves, and the third non-sound stimulation can be a video of a man or woman pushing a 6 horsepower push lawnmower.

The idea behind method action 1330 is to determine that the recipient has reached a status corresponding to that of FIG. 11, where the recipient can distinguish between two sounds within a sound genus. The idea behind method action 1340 is to move the recipient from the status of FIG. 11 to beyond that (an intermediate between FIG. 11 and FIG. 12, or to FIG. 12 in case there are that many species of the genus).

It is briefly noted that as used herein, the phrases genus and species can be objective or subjective. For example, the aforementioned example with the motorbike, the leaf blower and the motorbike are objective species of the objective genus of small but loud internal combustion engine powered devices. Conversely, consider a scenario where the cochlear implant operation causes the recipient to have difficulty distinguishing between a leaf blower and a garbage disposal (both of which generate high-frequency sounds), or thunder and a Diesel Semi-starting. These might not objectively be considered species within a genus, but for the recipient these are species within the genus, where the genus is a genus of sounds of the recipient cannot distinguish between. Thus, these species are subjective species of a subjective genus.

Figure 14:
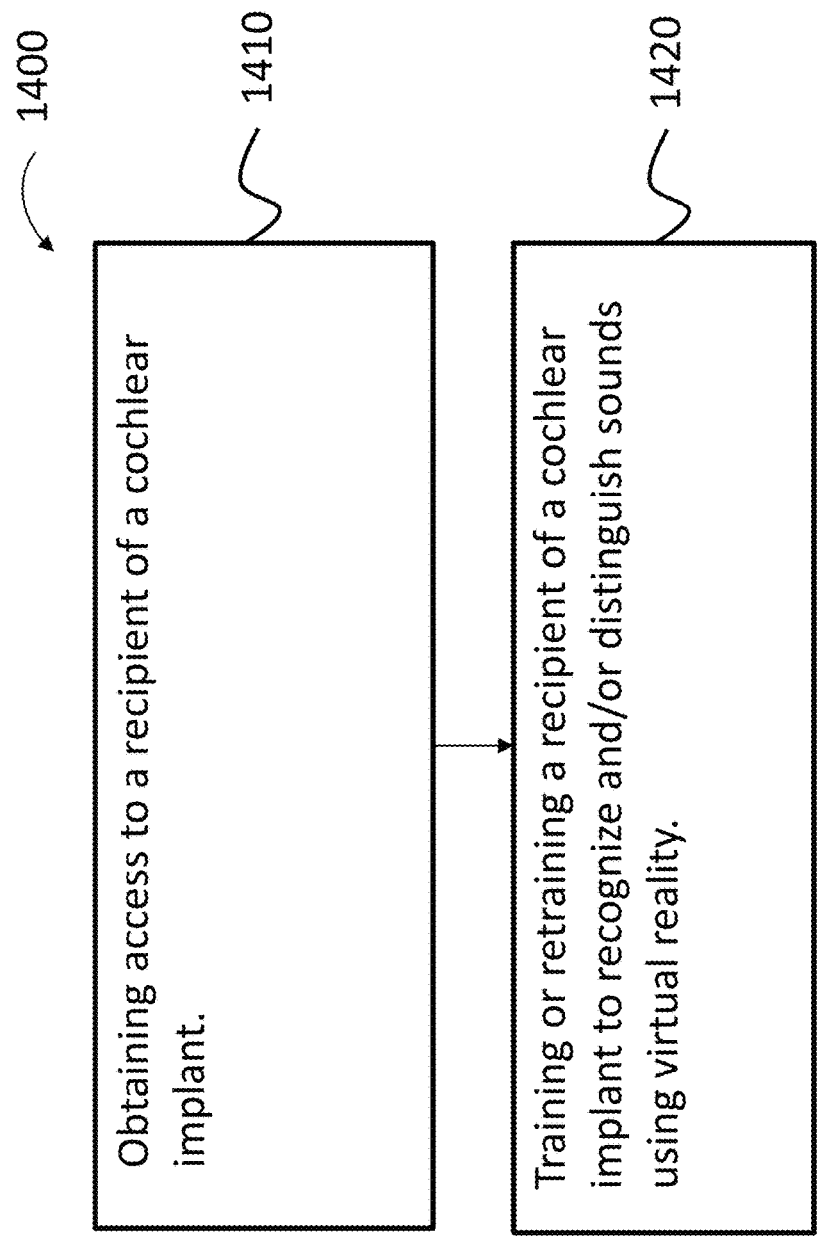

FIG. 14 presents an exemplary flowchart for an exemplary method, method 1400. Method 1400 includes method action 1410, which includes obtaining access to a recipient of a cochlear implant. This can entail permitting the recipient to visit a healthcare professional's office, or permitting the recipient access to an on-line system where everything is performed remotely. Note also that in at least some exemplary embodiments, method action 1410 is not executed. Method 1400 further includes method 1420, which includes training or retraining (the former for someone who has never heard before receiving a hearing prosthesis, the latter for someone who has heard before but has lost at least a portion of their hearing) a recipient of a cochlear implant to recognize and/or distinguish sounds using virtual reality. Method action 1420 can be executed utilizing any of the methods and systems detailed herein and/or variations thereof, or any other methods and actions and systems that will enable method action 1420 to be executed.

It is noted that in some embodiments, only method action 1420 is executed. By way of example only and not by way of limitation, in an exemplary embodiment, the recipient can obtain by himself or herself a virtual reality system or the like or otherwise access a virtual reality system that will enable the recipient to execute method action 1420 himself or herself (self-training, which is included in training). Accordingly, in an exemplary embodiment, method action 1410 could instead be an action of providing a virtual reality system to a recipient or providing access to a virtual reality system to the recipient or instructing the recipient to obtain access to a virtual reality system, etc.

In any event, in an exemplary embodiment of method 1400, which includes any of the above-variations, including by way of example only and not by way of limitation, the method that does not include method action 1410, the action of training or retraining includes providing audio-visual scenarios using virtual reality of increasing complexity as the recipient learns to recognize and/or distinguish sounds of the less complex scenarios. By way of example only and not by way of limitation, in an exemplary embodiment, an initial audio-visual scenario could be a single sound of a lawnmower with an image of a lawnmower. An increasingly more complex scenario could be the sound of a lawnmower combined with the sound of a television in the background with an image of television and the lawnmower spatially separated so as to give the virtual reality effect of someone who is watching TV with a window open or the like and in the background someone is cutting his or her lawn with a lawnmower. Alternatively, and/or in addition to this, an increasingly more complex scenario could be the sound of a lawnmower followed by the sound of a leaf blower. Then, an increasingly more complex scenario could be the sound of a lawnmower combined with the sound of a leaf blower. Alternatively, and/or in addition to this, an increasingly more complex scenario could be the provision of the sounds of a motorbike, a lawnmower, and a leaf blower along with the visual images.

The method can be executed utilizing the results of tests or the like to determine where the recipient is located along the recipient's habilitation or rehabilitation journey, and, based on those tasks, determine whether or not there is utilitarian value with respect to providing audiovisual scenarios of increasing complexity, and providing such if such is warranted, and if not, not proceeding with the increased complex scenarios. In this regard, the tests can be utilized to determine that the recipient has recognized and/or distinguished sounds of the less complex scenarios in a meaningful manner (e.g., not by accident, guessing, etc.). Again, such testing can be active testing or passive testing, where the recipient himself or herself engages in tests and the automated or semi-automated system determines whether or not the recipient has learned to recognize and/or distinguish sounds of the less complex scenarios.

It is briefly noted that while the embodiments described above have focused on increasingly complex scenarios based on object association/event association and the superimposition of sounds over one another, as will be described in greater detail below, scenarios of increased complexity can be related to other types of training vis-à-vis the recognition and/or distinguishment/discrimination of sounds, such as, by way of example only, sounds affected by reverberant environments, sounds associated with direction/locational sounds, etc.

Figure 15:
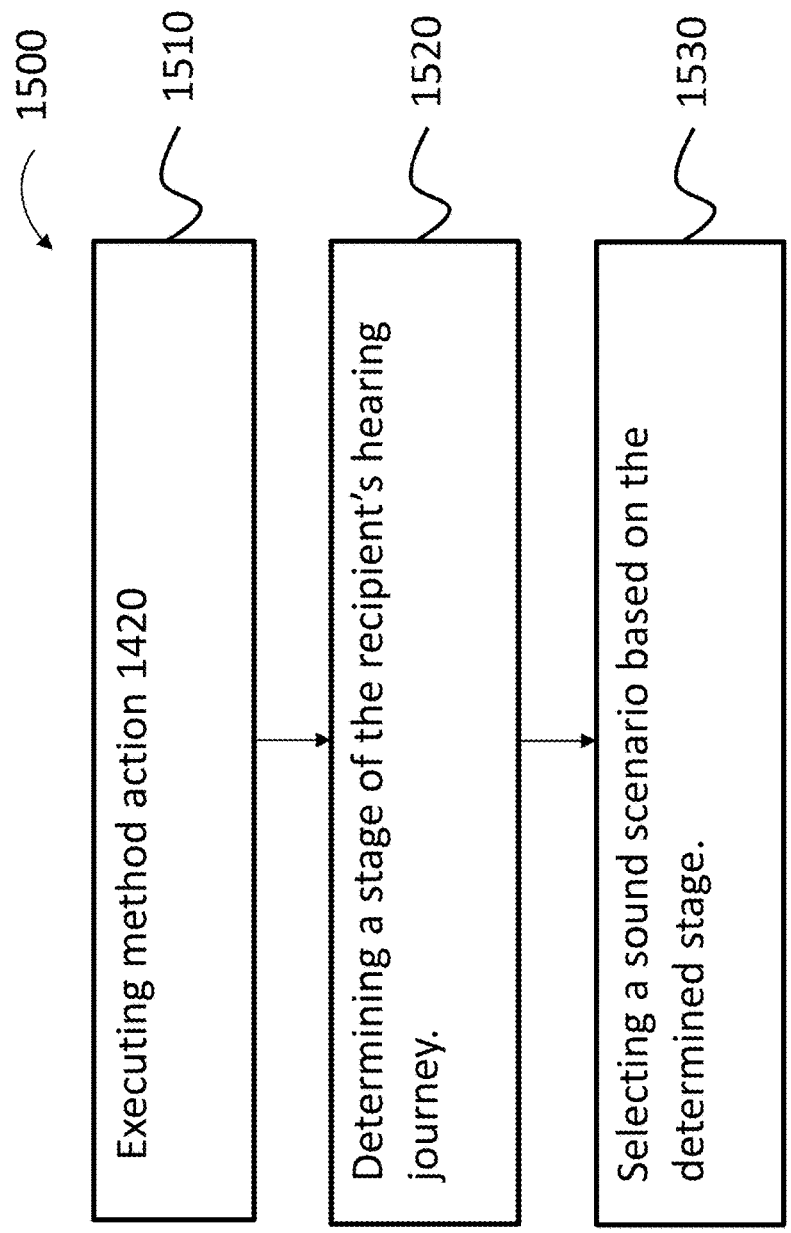

FIG. 15 presents another exemplary embodiment of an exemplary method, method 1500. Method 1500 includes method action 1510, which includes executing method action 1420. Method 1500 also includes method action 1520, which includes determining a stage of the recipient's hearing journey. In this regard, by way of example only and not by way of limitation, an audiologist or the like can evaluate how much the recipient has improved on his or her ability to hear and otherwise recognize sounds with his or her cochlear implant. This can be done by testing, or any other traditional manner utilized by audiologists or other healthcare professionals to determine how well a recipient hears with a cochlear implant. This can be based on active testing of the recipient, and/or on temporal data, age data, statistical data, data relating to whether or not the recipient could hear before having a cochlear implant, etc. Alternatively, and/or in addition to this, this can be done automatically or semi-automatically by a system, some of the details of which will be described in greater detail below, that can monitor or otherwise evaluate the recipient's ability to recognize or distinguish sounds. By way of example, the system can provide automated or semi-automated testing as described above. Alternatively, and/or in addition to this, the system can utilize some form of logic algorithm or a machine learning algorithm or the like to extrapolate the location of the recipient on his or her hearing journey based on the performance or even simply the usage of the methods and systems detailed herein. For example, if the recipient is "practicing" listening to sounds such as music and power tools, it can be assumed that the recipient thus is having problems distinguishing between the two types of sounds, and thus the recipient is relatively early in his or her hearing journey. Conversely, if the recipient is practicing listening to sounds such as opera music versus gospel music, it is likely that the recipient is further along in his or her hearing journey (because the recipient is trying to distinguish sounds that are somewhat close to one another). Perhaps a middle ground would be classical music versus jazz music, whereas an indicator of a more advanced status in the hearing journey could be the recipient practicing distinguishing the voice of a person who is 35 years old versus the voice of a person who is 65 years old. Note also that method action 1520 could be based on an analysis by the recipient himself or herself. Any device, system and/or method that can enable the stage of the recipient's hearing journey to be determined (which includes estimated) can be utilized in at least some exemplary embodiments.

Method action 1530 includes the action of selecting a sound scenario based on the determined stage. In this embodiment, the action of training or retraining in method action 1510 includes providing the selected sound scenario coupled with virtual reality based non-sound simulation. The complexity of the selected sound scenario will be greater if the recipient is further along his or her hearing journey relative to that which would be the case if the recipient was not so far along on the hearing journey. That is, the sound scenario could be that which is designed to help train the recipient to distinguish between a male voice and a female voice if the recipient is further along in his or her hearing journey relative to that would be the case with respect to a recipient at the beginning of his or her hearing journey, where the sound scenario would be directed towards having the recipient simply recognize speech or distinguish speech from background noise.

Figure 16:
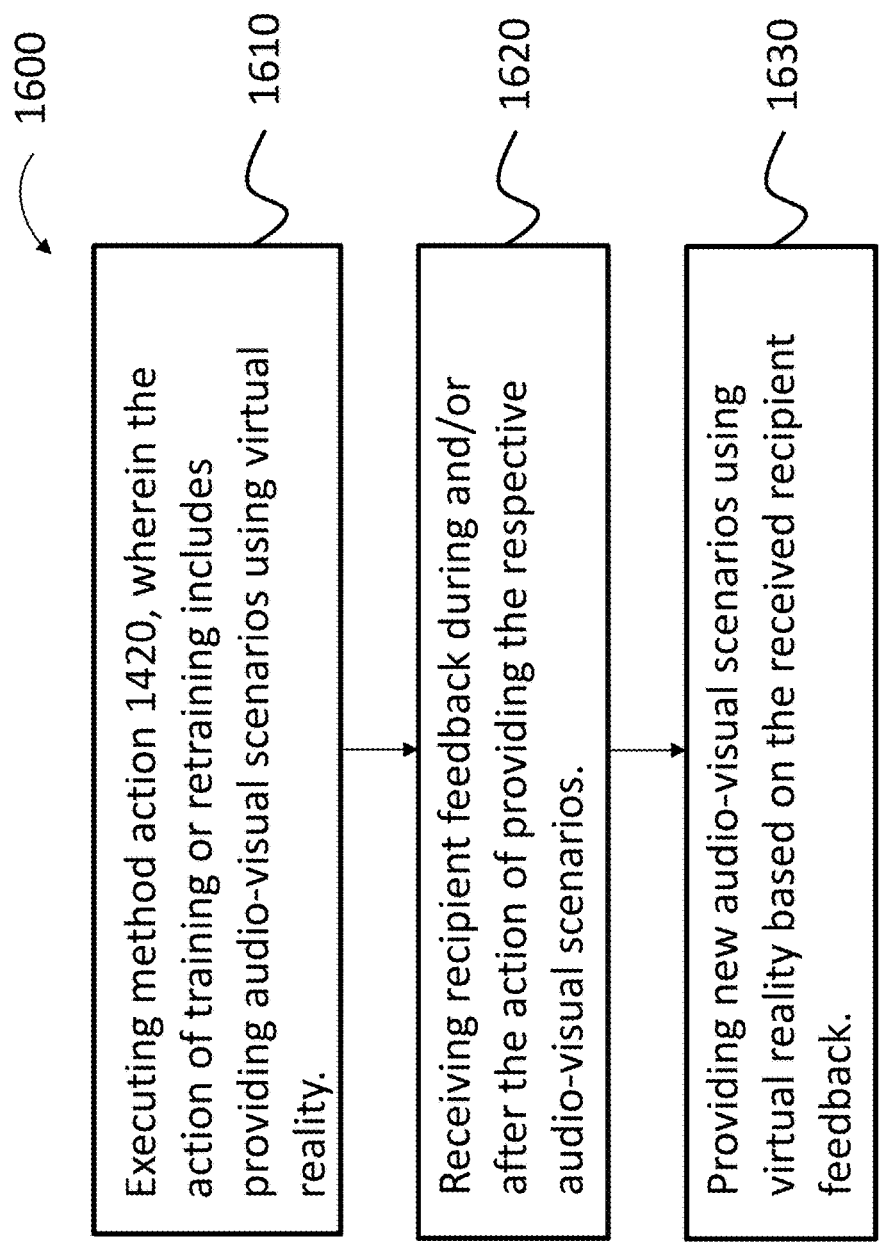

FIG. 16 presents another exemplary flowchart for an exemplary method, method 1600, which includes method action 1610, which includes executing method 1420 detailed above, with the additional provision that the action of training or retraining includes providing audio-visual scenarios using virtual reality. Method 1600 further includes method action 1620, which includes the action of receiving recipient feedback during and/or after the action of providing the respective audio-visual scenarios, and method action 1630, which includes providing new audio-video scenarios utilizing virtual reality based on the received recipient feedback. Accordingly, in an exemplary scenario of the execution of method 800, if the recipient finds that he or she is generally having success at recognizing and/or discriminating/distinguishing different sounds with respect to the provided audio-visual scenarios utilizing virtual reality, the recipient can provide feedback to an audiologist and/or to a system that is managing or otherwise providing the audio-visual scenarios utilizing virtual reality to the recipient, and then, based on this received recipient feedback (upon a determination that the recipient finds that he or she is having success at recognizing and/or discriminating the sounds), new audio-visual scenarios utilizing virtual reality which are more complex or otherwise more challenging are provided. That said, in an alternate scenario, where a recipient finds that he or she is generally having less success at recognizing and/or distinguishing different sounds with respect to the provided audio-visual scenarios utilizing virtual reality, the recipient can provide feedback to an audiologist and/or to a system that is managing or otherwise providing the audio-visual scenarios utilizing virtual reality to the recipient, and then, based on the received recipient feedback (upon a determination of the recipient finds that he or she is having less success than that which is desirable at recognizing and/or discriminating the sounds), new audio-visual scenarios utilizing virtual-reality which are less complex or otherwise less challenging are provided. Still further, the newly provided scenarios may not necessarily be more challenging or less challenging, but may instead be directed towards just different sounds. For example, if the recipient can distinguish between the leaf blower, the lawnmower, and the motorcycle, a new set of sounds directed towards, for example, a hydraulic motor and an electric air pump may be provided in the scenarios.

The point is that with respect to method 1600, the action of providing new audio-visual scenarios is based on feedback received by the recipient. Again, it is noted that this feedback can be provided into the system directly by the recipient. In an exemplary embodiment the recipient can indicate that he or she is comfortable with a given sound, and the system can then proffer new scenarios to be provided to the recipient or otherwise just implement the new scenarios to the recipient automatically.

It is noted that in an exemplary embodiment of method action 1420, the action of training or retraining results in the recipient distinguishing between different species of sounds of a genus of sounds, wherein the recipient could not distinguish between those different species of sounds prior thereto. In an exemplary embodiment, the action of training or retraining results in the recipient distinguishing between different species of sounds of a genus of sounds at a success rate, when just exposed to those sounds in a sterile sound booth in a blind test mode, at a success rate of at least 50%, 60%, 70%, 80%, 90%, 95%, or 100% or any value or range of values therebetween in 1% increments (57% or more, 82% or more, 75% to 93%, etc.). By way of example only and not by way of limitation, an exemplary standardized test/ hearing evaluation regime can be one or more of those proffered or otherwise obtainable or managed or utilized or administered by CUNY tests/HEAR Works™, as of Jan. 26, 2017. By way of example only and not by way of limitation, the AB Isophonemic Monosyllabic Word test sometimes accredited to Arthur Boothroyd, which is an open set speech perception test comprising 15—ten word lists might be utilized in some embodiments. By way of example only and not by way of limitation, the BKB-A sentence list test sometimes attributable to Bench et. al. is an open set speech perception test which can be utilized in some embodiments. The Central Institute for the deaf everyday sentence test can be utilized, CNC word lists can be utilized, CUNY sentence lists can be utilized. In some exemplary embodiments, any of the tests that are available from HEARworks Shop™ related to speech perception tests which are available as of Jan. 26, 2017 can be utilized in some exemplary embodiments. It is noted that any disclosure herein of a sound booth test or the like corresponds to a disclosure of any of one or more of the aforementioned tests or variations thereof.

In an exemplary embodiment, the action of training or retraining results in the recipient distinguishing between different species of sounds of a genus of sounds at a success rate, when just exposed to those sounds in a sterile sound booth in a blind test mode, at a success rate of at least 1.5 times, 1.75 times, 2.0 times, 2.25 times, 2.5 times, 2.75 times, 3 times, 3.5 times, 4 times, 4.5 times, 5 times, 6 times, 7 times, 8 times, 9 times, or 10 times or more than that which was the case prior to executing method action 1420.

In an exemplary embodiment, the action of training or retraining of method action 1420 results in the recipient being able to recognize a given sound in different reverberant environments, wherein the recipient could not recognize the sounds in the different reverberant environments prior thereto. In an exemplary environment, the action of training or retraining results in the recipient being able to at least one of recognize a given sound in different reverberant environments or distinguish between a sound in different reverberant environments, wherein the recipient could not at least one of respectively recognize the sounds in the different reverberant environments prior thereto or distinguish between the sound in different reverberant environments prior thereto.

It is noted that the utilization of different reverberant environments can be utilized in modified methods and systems detailed herein. By way of example only and not by way of limitation, herein there are teachings directed towards presenting different sounds species of a sound genus to a recipient. In alternative embodiments of these methods, instead of a different sound species of a sound genus, different sound environment species of a given sound environment genus can be provided to the recipient, where a sound species is the same in the different sound environment species. By way of example only and not by way of limitation, the sound of singing can be a sound species, and a first sound environment species can be a church hall and a second sound environment species can be an open field (where the same sound species singing, is used for the two). Accordingly, in an exemplary embodiment, with reference to method 800, the first sound and non-sound stimulation scenario can be such that the sound portion is singing in a church, and the non-sound stimulation portion is a visual image of people singing in a church, and the second sound and non-sound stimulation scenario can be such that the sound portion is singing in an open field, and the non-sound stimulation portion is a visual image of people singing in an open field. This concept is also applicable to method 900 and method 1300, and the concept behind FIGS. 10, 11, and 12, where, initially, all sounds are grouped is the same sound regardless of the environment in which the sound exists, and then gradually the recipient can learn to distinguish different sounds and different reverberant environments.

Note also that this concept is applicable to method 200 and the related methods (300, 400, 500, etc.), where the first input is a hearing percept indicative of a sound impacted by a reverberant environment, and the second input is input of a non-hearing type that is related to the reverberant environment (e.g., the sound of a lawnmower when the recipient is outside versus the sound of a lawnmower when the recipient is inside a house, the sound of people speaking in a room versus the sound of people speaking in a car traveling at 55 miles per hour on an interstate highway in the United States, etc.). This concept of utilizing sound impacted by a reverberant environment is also applicable to method 700. To be clear, any disclosure herein utilizing a sound/presenting a sound to a recipient also corresponds to a disclosure of an alternate embodiment where the sound is influenced by a reverberant environment or otherwise is based on an environment that impacts sound. That is, any disclosure herein can be modified to utilize sound that has been impacted by a reverberant environment providing that the art enables such.

In an exemplary embodiment, the sounds presented to the recipient can have different amplitudes for different presentations of the same base sound, wherein the methods and systems detailed herein are utilized to train the recipient to recognize and/or distinguish between different reverberant sounds. The number and amplitude of the multipath echoes from a sound can be different for different presentations of the same base sound, wherein the methods and systems detailed herein are utilized to train the recipient to recognize and/or distinguish between different reverberant sounds. In an exemplary embodiment, the methods and systems detailed herein are configured to train the human brain to compensate for the environment in understanding the sound. Concomitant with the teachings herein, these sounds that are presented to the recipient having different reverberant features are presented along with non-hearing/non-sound input (visual, tactile, etc.) to the recipient in a temporally related manner (temporally correlated, in close temporal proximity, etc., as detailed herein).

Accordingly, exemplary embodiments that utilize reverberant sounds can be directed towards training cochlear implant recipients to associate how different sounds "sound" different in different environments.

In an exemplary embodiment, the teachings detailed herein relating to reverberant sounds can be utilized in conjunction with the other teachings detailed herein. By way of example only and not by way of limitation, the teachings detailed herein with regard to training a recipient to recognize or otherwise distinguish sound species can be first utilized, and then upon the recipient being sufficiently trained or otherwise adequately capable of distinguishing or otherwise recognizing the sound species, a given sound species that the recipient now can comfortably recognize or distinguish is presented in different reverberant environments. Thus, in an exemplary embodiment, the techniques detailed herein with regard to reverberant sounds is an extension of the event association (e.g., object association detailed herein). That said, there will be sounds that the recipient does not need to be trained on vis-a-vis event association, and thus, in at least some exemplary scenarios, for some sounds, the recipient will begin with the reverberant sound recognition/distinguish training.

This concept is also applicable to method 1400, and the methods that utilize method action 1420, where, the training or retraining of the recipient of a cochlear implant is done so that the recipient can recognize and/or distinguish reverberant sounds utilizing virtual-reality.

In an exemplary embodiment, the action of training or retraining results in the recipient being able to recognize sounds in different reverberant environments at a success rate, when just exposed to those sounds in a sterile sound booth in a blind test mode, at a success rate of at least 50%, 60%, 70%, 80%, 90% or 95% or 100% or any value or range of values therebetween in 1% increments (57% or more, 82% or more, 75% to 93%, etc.). In an exemplary embodiment, the action of training or retraining results in the recipient being able to recognize a given sound in different reverberant environments at a success rate, when just exposed to those sounds in a sterile sound booth in a blind test mode, at a success rate of at least 1.5 times, 1.75 times, 2.0 times, 2.25 times 2.5 times, 2.75 times, 3 times, 3.5 times, 4 times, 4.5 times, 5 times, 6 times, 7 times, 8 times, 9 times, or 10 times or more than that which was the case prior to executing method action 1420.

In an exemplary embodiment, the teachings detailed herein with regard to training a recipient to better recognize or otherwise distinguish between sounds due to reverberation can enable the recipient to better identify a given sound and/or can enable the recipient to better identify his or her surroundings based on sound. The ability of the recipient to cope with reverberation can also have utilitarian value with respect to the recipient being able to disregard changes in hearing input due to reverberation. By way of example only and not by way of limitation, the sound of an automobile can sound differently when the automobile drives through an underpass and/or through a tunnel, etc. This change in the sound can be potentially unsettling to some recipients. In an exemplary embodiment the recipient may believe that there is a problem with the car, whereas other normal hearing people will just recognize that that is simply the difference in sound that a car makes when traveling through an underpass.

It is also noted that an own voice interaction with an environment can be applied according to some methods. Moreover, in an exemplary embodiment, the systems detailed herein are configured to alter the sound of the recipient's voice to accommodate a given environment. For example, consider a scenario where the environment of the virtual-reality world is a church hall, but the recipient is in a normal room. The pre-recorded sounds can be sounds corresponding to the traversal environment, but the recipient's voice will not correspond to such, in some embodiments. Thus, the system can alter the recipient's voice to sound as it would in the virtual-reality environment presented to the recipient. By way exemplary scenario, consider the scenario where the virtual-reality system is providing an environment corresponding to, for example, a church hall, although the real environment they are standing in is a field with no objects around them, so there are minimal sound reflections. In this case when the recipient speaks, they would hear their own voice in a dry manner, although the virtual-reality environment would be that of highly reverberant environment. The system can be configured to integrate the recipient's own voice into the virtual-reality environment. By way of example only and not by way limitation, this can be done by assuming the recipient's own voice is coming from a virtual environment center, and processing on the audio line modifies the sound from a dry to wet signal as described by the virtual-reality environment. Note also that this concept of modifying one's own voice to reflect the virtual environment can have utilitarian value with respect to computer games or the like. Accordingly, in an exemplary embodiment, there is an exemplary method where the recipient's own voice is modified to correspond or otherwise better correspond to a given reverberant environment. Such that the hearing percept is different corresponding to the given reverberant environment presented by the virtual-reality system.

Figure 17:
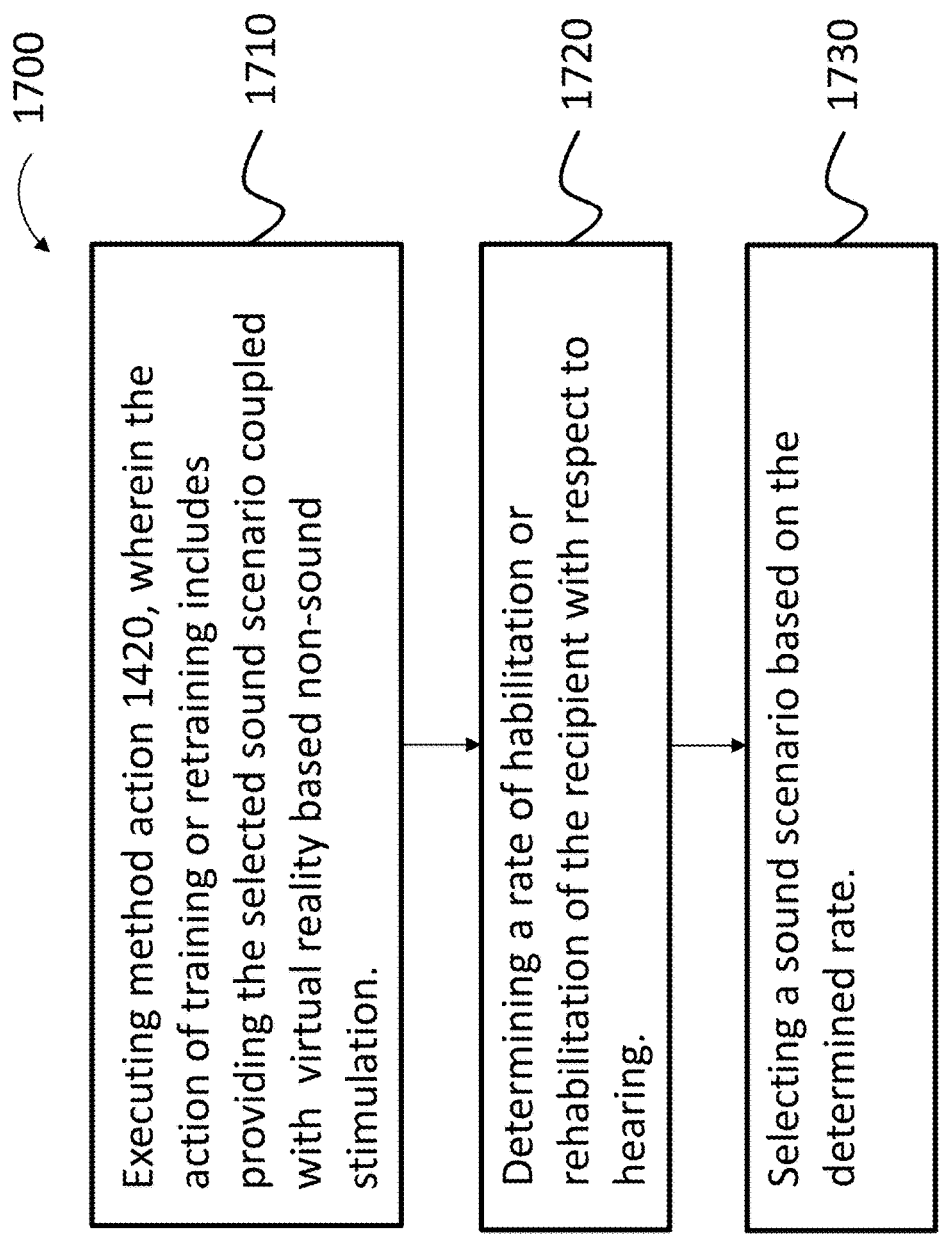

FIG. 17 presents an exemplary flowchart for an exemplary method, method 1700, which includes method action 1710, which includes executing method action 1420, wherein the action of training or retraining includes providing the selected sound scenario coupled with virtual-reality non-sound stimulation (e.g., visual, tactile, smell, etc.). Method 1700 further includes method action 1720, which includes determining a rate of habilitation or rehabilitation of the recipient with respect to hearing. Again, as with all of the methods detailed herein unless otherwise indicated or otherwise not enabled by the art, the method actions of method 1700 can be executed in a different order. Thus, it is noted that in some embodiments, method action 1720 can be executed before method action 1710. In any event, in an exemplary embodiment, determining a rate of habilitation or rehabilitation of the recipient can have utilitarian value with respect to developing a regime for providing the sound scenarios. In this regard, in an exemplary embodiment, a recipient that is progressing at a high rate of habilitation or rehabilitation can be given, in some embodiments, more sophisticated sound scenarios, while in other embodiments, a recipient that is progressing at a medium rate of habilitation or rehabilitation can be given, in some embodiments, average sophisticated sound scenarios, while still further in other embodiments, a recipient that is progressing at a low rate of habilitation or rehabilitation can be given, in some scenarios, less sophisticated sound scenarios. Accordingly, in the embodiment of FIG. 17, method 1700 further includes method 1730, which includes selecting a sound scenario based on the determined rate. In an exemplary embodiment, action 1720 and 1730 can be done manually by a healthcare professional or the like. In this regard, a series of tests can be provided to the recipient to evaluate his or her habilitation or rehabilitation at various temporal points, and a rate of the habilitation or rehabilitation can be determined. Alternatively, the performance of the recipient can be evaluated through other means, such as by considering the types of sound scenarios that the recipient has been subjected to over a period of time. If the types of sound scenarios show an increasing level of sophistication over time, a rate of habilitation or rehabilitation can be determined. Still further, the recipient can self-diagnose himself or herself, and provide such data to the healthcare professional.

Alternatively, and/or in addition to this, actions 1720 and 1730 can be executed semi-automatically or automatically. In this regard, in an exemplary embodiment, a series of tests can be automatically provided by the system that is utilized to execute at least a portion of method 1700. Still further, the recipient can prompt a test to be provided to himself or herself when he or she feels that he or she is ready to move on to more sophisticated sound scenarios. The system can thus provide a test to the recipient. Based on the results of these tests, the system can select a sound scenario based on the determined rate. Still further, in an exemplary embodiment, one of actions 1720 or 1730 can be performed automatically or semi-automatically, and the other of actions 1720 and 1730 can be performed manually, or vice versa, and any combination thereof. By way of example only and not by way of limitation, the rate of habilitation or rehabilitation of the recipient with respect to hearing can be determined in an automated fashion, but the action of selecting a sound scenario based on the determined rate can be performed by a professional manually, which professional evaluates the determined rate of habilitation to select the sound scenarios. Any device, system, and/or method that can enable the determination of a rate of habilitation or rehabilitation of the recipient with respect to hearing, and/or that can select a sound scenario based on the determined rate can be utilized in at least some exemplary embodiments, providing that the art enables such.

It is noted that while the just-described systems and methods have been described in terms of determining a rate of habilitation or rehabilitation of the recipient with respect to hearing, it is noted that in some alternate embodiments, the above teachings can be also applicable to determining a status of habilitation or rehabilitation, or any other subjective state of the recipient that can have utilitarian value with respect to selection of a sound scenario or other type of training regime detailed herein to be provided or otherwise used by the recipient. Accordingly, any disclosure herein of a device or system or method of determining a rate of habilitation or rehabilitation corresponds to a disclosure in an alternate embodiment of a device or system or method of determining a status of the recipient vis-à-vis his or her ability to hear otherwise recognize her distinguished sounds, etc.

It is noted that while the embodiments detailed herein are directed towards multiple different sound scenarios and types of sounds, at least some exemplary embodiments focus on speech. In this regard, in an exemplary embodiment, the sounds of method action 1420 are speech sounds. In at least some exemplary embodiments, the teachings detailed herein can train a cochlear implant recipient to become more proficient at identifying the distinct patterns of speech relative to that which would be the case in the absence of the application of the teachings detailed herein. In an exemplary embodiment, as mentioned above, the various inputs representative of sound can be species events corresponding to a man and a woman speaking, respectively, an older person and a younger person speaking, people speaking with respective different accents, etc. In an exemplary embodiment, the methods and systems detailed herein are such that speech is generated or otherwise provided to the recipients of the hearing implant, which speech includes particular species characteristics of a genus of a characteristic, along with respective matching non-hearing cues, such as by way of example only and not by limitation, visual cues. In an exemplary embodiment, speech of a young person can be matched with a visual cue of an image of a young person.

It is also noted that in at least some exemplary embodiments, the methods detailed herein are applicable to training a recipient how to better lip read with the assistance of a cochlear implant. In this regard, in an exemplary embodiment, the visual images provided by the systems detailed herein are of a human being speaking in general, and the lips of the human being moving while speaking in particular, coupled with the audio cue corresponding to the sound of the person's voice. In this regard, with respect to method 200, by way of example, the activation of the cochlear implant evokes a hearing percept based on the first input corresponding to the voice, and the received a second input from the virtual-reality system of method 200 corresponds to the image of the person speaking in general, and the image of the person's lips moving in particular. It is to be understood that other methods detailed herein are applicable to this training regime as well.

Thus, in at least some exemplary embodiments, the teachings detailed herein can have utilitarian value with respect to training a recipient's to distinguish between a man and a woman's voice. Accordingly, in an exemplary scenario of method 800 includes a scenario where the first sound is a speech of a woman in the first non-sound stimulation is a visual image of a woman, and the second sound is a speech of a man and the second non-sound stimulation is a visual image of a man. As with the other methods detailed herein, unless otherwise noted, the utilization of the phrases "first sound," and "second sound" do not represent temporal primacy, but instead are utilized for purposes of identification only. In this regard, as noted above with respect to at least some of the embodiments detailed above, simply because method action 820 is depicted in the flowchart as following method action 810, that does not mean that method 800 requires method 820 to follow method 810. This as opposed to embodiments where it is specifically noted that the second sound and non-sound stimulation scenario follow the first sound and nonstandard simulation scenario.

Some exemplary embodiments of the methods and systems detailed herein and variations thereof can enable a recipient to train himself or herself in identifying or otherwise appreciating the finer points of speech. This can enable the recipient to become more comfortable to expose himself or herself in social situations, and otherwise reintegrate the recipient into society.

With respect to the efficacy of training a recipient to better distinguish or otherwise recognize sounds utilizing the teachings detailed herein, in an exemplary embodiment, utilizing a blind sterile test, a given recipient participating in the methods and/or utilizing the systems detailed herein can have an improved ability to recognize given sounds or otherwise distinguish between given sounds (where the sounds are presented according to the teachings detailed herein—speech, object sounds, sound subject to reverberation, sounds based on location, etc.) and/or determine directionally of sound (described in greater detail below) that is at least 10%, 15%, 20%, 25%, 30%, 35%, 40%, 45%, 50%, 55%, 60%, 70%, 80%, 90%, 100%, 120%, 140%, 160%, 180%, 200%, 225%, 250%, 275%, 300%, 350%, 400%, 450%, 500%, 600%, 700%, 800%, 900%, or 1000% or more than that which would be the case for a similarly situated person (statistically/human factors speaking—same age, same sex, same education, same length of time without normal hearing, same time since implantation of prosthesis (at least statistically speaking), age of implantation of prosthesis, same IQ, same profession and/or same background, etc.) without the utilization of the methods and systems detailed herein, all other things being equal.

Figure 18:
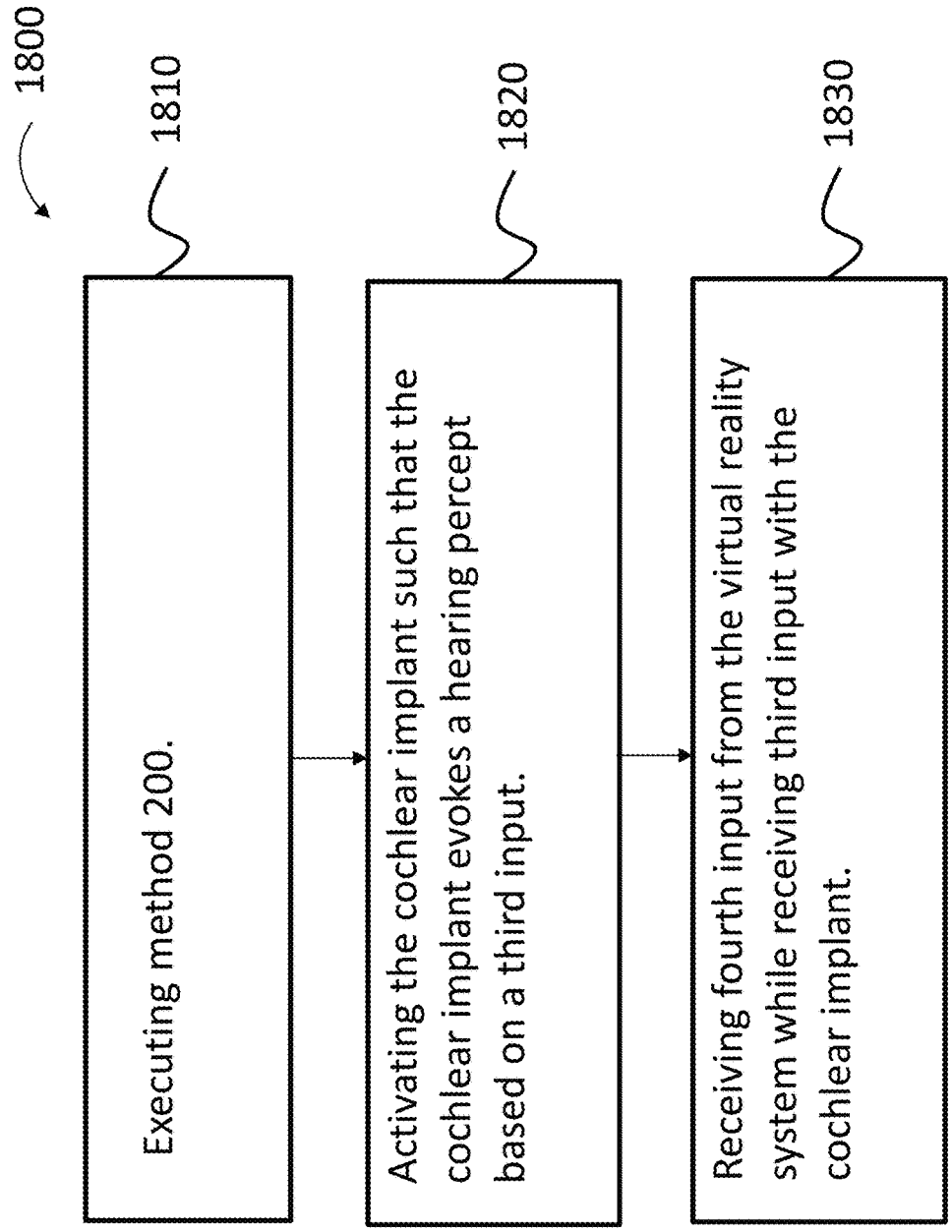

It is noted that the teachings detailed herein can have utilitarian value with respect to training a recipient to better identify nuances in music. To this end, FIG. 18 represents an exemplary flowchart for an exemplary method, method 1800, which includes method action 1810, which includes executing method 200. Method 1800 further includes method action 1820, which includes activating the cochlear implant such that the cochlear implant evokes a hearing percept based on a third input. In this exemplary embodiment, the first input is based on musical notes played by a first musical instrument, and the third input is based on the musical notes played by a second musical instrument of a different type than the first musical instrument. In an exemplary embodiment, the first musical instrument can be a trumpet, and the second musical instrument can be a trombone. In an exemplary embodiment, the first musical instrument can be a guitar, and the second musical instrument can be a keyboard or piano. Method 1800 further includes method action 1830, which includes receiving fourth input from the virtual-reality system while receiving third input with the cochlear implant. In an exemplary embodiment, the second and fourth inputs are images of the respective first and second musical instruments.

It is to be understood that in an exemplary embodiment, method 1800 can be expanded to encompass additional musical instruments beyond just two musical instruments.

Figure 19:
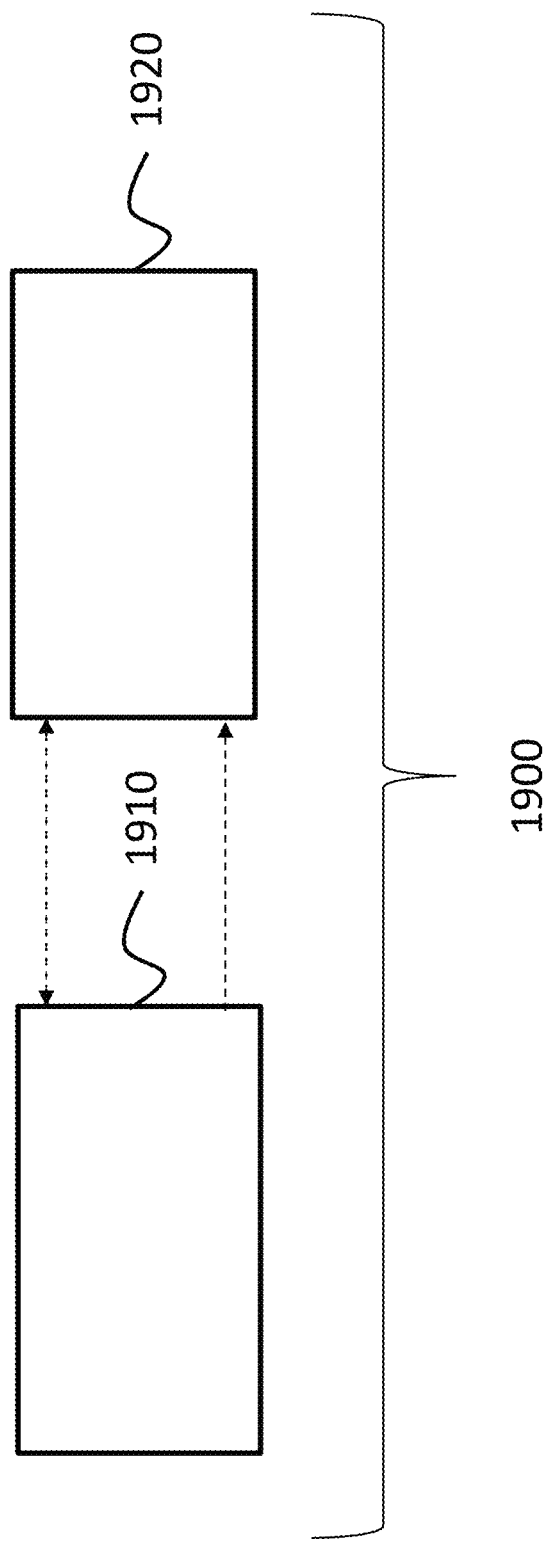
FIG. 19 presents an exemplary functional schematic of a system according to an exemplary embodiment, with which one or more or all of the various method actions detailed herein can be implemented.

FIG. 19 depicts an exemplary system, system 1900, according to an exemplary embodiment. System 1900 includes a virtual-reality sub-system 1910, and a hearing prosthesis 1920. The virtual reality sub-system 1910 is configured to provide first output to the hearing prosthesis 1920. Additional details regarding the virtual-reality subsystem 1910 will be described in greater detail below with respect to FIG. 20. The hearing prosthesis 1920 can correspond to the hearing prosthesis 100 detailed above. The hearing prosthesis 1920 is configured to evoke a hearing percept in a recipient thereof based on the first output, the virtual reality sub-system 1910 is configured to simultaneously provide second output to the recipient of the hearing prosthesis to evoke a second sensation different from hearing. In this embodiment, the second sensation is a sensation that results from the real-life physical phenomenon that results in the hearing percept.

In an exemplary embodiment, the first output is a sound signal, whether this be transmitted to the cochlear implant via an acoustic medium or via a hardwired medium or a wireless medium electronically. Any device, system, and/or method of providing a sound signal to the hearing prosthesis 1920 can be utilized in at least some exemplary embodiments, providing that such enables the hearing prosthesis to evoke a hearing percept in a recipient based on this output. The second sensation is a sensation that results from the real-life physical phenomenon that results in a hearing percept. In an exemplary embodiment, this can be an image of the object that produces the sound (e.g., with a sound as the sound of a lawnmower, an image of a lawnmower). To be clear, in an exemplary embodiment, system 1900 is configured to implement one or more or all of the methods detailed herein and/or variations thereof. Accordingly, system 1900 includes computers and processors and software and firmware, etc., to implement the method actions detailed herein in an automated and/or a semi-automated fashion. In an exemplary embodiment, system 1900 is configured to implement, in a semi-automated and/or in an automated fashion, one or more or all of the method actions detailed herein.

As can be seen from FIG. 19, the system 1900 is configured such that there can be two-way communication between the virtual-reality subsystem 1910 and the hearing prosthesis 1920 or one way communication from the virtual reality subsystem 1910 to the hearing prosthesis 1920. Note further that the virtual-reality subsystem 1910 can be a subsystem that is bifurcated between two or more locations as will be described in greater detail below.

In an exemplary embodiment, the virtual-reality subsystem is a set of virtual-reality eyeglasses or goggles that includes or otherwise is linked to an image generation system, such as the sub component that generates the images in a desktop computer that are presented to a display or screen of the computer, where the sub component of a flight simulator or the like that generates the images that are displayed on screens to a pilot, etc. The virtual-reality subsystem could instead be a booth or a room in which the recipient is located which has visual displays that are linked to an image generation system. Still further, consistent with the teachings detailed above, the virtual reality subsystem could include nozzles and fans and lights and other devices to simulate rain, wind, lightning, etc. The virtual-reality subsystem could include outlets to pump gas into the room or towards the recipient's nose to simulate smells. The virtual-reality subsystem can also include feeding tubes of the like to provide substances to the recipient to simulate the sensation of taste.

Consistent with the teachings detailed herein, system 1900 is configured to train the recipient in sound-object association by evoking a hearing percept of a sound produced by an object and presenting an image of the object using the virtual reality sub-system. Still further, consistent with the teachings detailed herein, system 1900 is configured to train the recipient in sound-location association by evoking a hearing percept of a sound and providing a virtual-reality stimulus to the recipient indicative of a directional origin of the sound.

With respect to this ladder embodiment of providing a virtual-reality stimulus of the recipient indicative of a directional origin of sound, in an exemplary embodiment, there are devices and systems and methods directed towards training a recipient to better localize sound. In an exemplary embodiment, the systems and methods detailed herein can be utilized to help recipients develop and/or redevelop sound localization skills. In at least some scenarios, sound localization is based on entry-level timing (ITD) and inter-level loudness (ILD) differences between sound received by the two ears. Accordingly, in an exemplary embodiment, a virtual-reality sub-system can include software and/or firmware and hardware, such as processors and the like, to provide output to the hearing prosthesis such that the hearing percept evolved by the hearing prosthesis has different ITDs and/or ILDs thus providing a directionality component to the evoke a hearing percept. In some exemplary embodiments, the system 1900 is configured to do this for a recipient that is unilaterally implanted with a cochlear implant, or a bimodal recipient with a cochlear implant in one side and a conventional hearing aid in the other. In some exemplary embodiments, the system 1900 is configured to do this for a recipient that is bilaterally implanted with a cochlear implant. In this regard, in an exemplary embodiment, the processors can be configured, via programming, to provide output to the one or more cochlear implants such that the ITDs and/or the ILDs provide a directionality component to the sound.

In an exemplary embodiment, the system 1900 is configured to generate audio signals to both ears with controlled ITDs and/or ILDs to correspond to different locations of an origination of sound. Consistent with the teachings detailed herein, in an exemplary embodiment, the system provides matching visual stimulation corresponding to the location rendered for the object generating the sound/event resulting from the sound. Still further, in an exemplary embodiment, the system provides matching tactile stimulation corresponding to the location rendered for the object generating the sound/event resulting from the sound. By way of example only and not by way of limitation, the sound of wind can be combined with wind blowing on the recipient from one side of the recipient as opposed to the other side of the recipient, which wind can be generated by a fan. In an exemplary embodiment, the teachings detailed herein enable the cochlear implantee to retrain the brain to perceive different cues to infer the location information from sound.

In an exemplary embodiment, the teachings detailed herein relating to localized sounds can be utilized in conjunction with the other teachings detailed herein. By way of example only and not by way of limitation, the teachings detailed herein with regard to training a recipient to recognize or otherwise distinguish sound species can be first utilized, and then upon the recipient being sufficiently trained or otherwise adequately capable of distinguishing or otherwise recognizing the sound species, a given sound species that the recipient now can comfortably recognize or distinguish is presented in different localized environments. Thus, in an exemplary embodiment, the techniques detailed herein with regard to localized sound environments is an extension of the event association (e.g., object association detailed herein). That said, there will be sounds that the recipient does not need to be trained on vis-a-vis event association, and thus, in at least some exemplary scenarios, for some sounds, the recipient will begin with the localized sound recognition/distinguish training.

This concept is also applicable to method 1400, and the methods that utilize method action 1420, where, the training or retraining of the recipient of a cochlear implant is done so that the recipient can recognize and/or distinguish localized sounds utilizing virtual-reality.

In an exemplary embodiment, the action of training or retraining results in the recipient being able to recognize localized sounds (i.e., correctly determine from what direction a sound originates) at a success rate, when just exposed to those sounds in a sterile sound booth in a blind test mode, at a success rate of at least 50%, 60%, 70%, 80%, 90%, or 95% or 100% or any value or range of values therebetween in 1% increments (57% or more, 82% or more, 75% to 93%, etc.). In an exemplary embodiment, the action of training or retraining results in the recipient being able to recognize a location of a given sound in different location environments at a success rate, when just exposed to those sounds in a sterile sound booth in a blind test mode, at a success rate of at least 1.5 times, 1.75 times, 2.0 times, 2.25 times 2.5 times, 2.75 times, 3 times, 3.5 times, 4 times, 4.5 times, 5 times, 6 times, 7 times, 8 times, 9 times, or 10 times or more than that which was the case prior to executing method action 1420.

In an exemplary embodiment, the system can test the recipient on his or her localization perception without the matching visual stimulation so as to ascertain or otherwise obtain data based on the recipient's ability to properly or otherwise effectively identify the location origins of sounds.

As noted above, the devices and systems detailed herein can be configured to detect movement of the recipient's head, such as the direction of movement of the recipient's head, in one direction or another direction, which should be indicative of the direction from which the recipient perceives a sound to be originating. In such exemplary embodiments, the system and/or device can be configured to determine whether or not the recipient has properly or correctly perceived the originating direction of the sound. Accordingly, in an exemplary embodiment, the virtual-reality system can include accelerometers and/or image capture devices (cameras) or position devices (lasers or RF locators, etc.) to determine or otherwise track movements of a recipient's head. In an exemplary embodiment, the virtual-reality system is configured to detect which direction or otherwise ascertain which direction the recipient moves his or her head and treat such as feedback from the recipient indicative of the direction of origination of a given sound perceived by the recipient.

In at least some exemplary embodiments, the system 1900 is configured to train the recipient in reverberant sound recognition by evoking a hearing percept of a sound and providing an image of an environment in which the sound having a given reverberation is heard. In an exemplary embodiment, the system 1900 is configured to execute one or more or all of the method actions detailed herein with regard to reverberant sound training. Still further, in an exemplary embodiment, the first output to the hearing prosthesis evokes a hearing percept of a reverberant sound and the system is configured to provide a visual cue corresponding to an environment in which the reverberant sound is heard using the virtual reality sub-system.

In an exemplary embodiment, the system is configured to provide a visual sensation as the second sensation and a third tactical sensation which also results from the real-life physical phenomenon that results in the hearing percept (e.g., the sound of a two-stroke engine operating, an image of a lawnmower, and the smell of burnt oil).

Also, in an exemplary embodiment, the system is configured to train the recipient to recognize and/or differentiate between speech types by evoking a hearing percept of speech and providing an image of a speaker.

Consistent with the teachings detailed herein, in an exemplary embodiment, the system is configured to automatically select a given hearing-second sensation scenario to provide to the recipient based on input indicative of an inability of the recipient to distinguish the scenario from another similar scenario. In an exemplary embodiment, the input can come from a healthcare professional or the like or from the recipient himself or herself. In an exemplary embodiment, the input comes from a test provided to the recipient. In an exemplary embodiment, the input corresponds to data obtained by the system regarding the recipient's ability and/or inability to distinguish scenarios.

It is noted that any disclosure herein of a system or an apparatus having functionality corresponds to a disclosure of a method of using that system and/or apparatus and a method corresponding to the functionality. Accordingly, with respect to system 1900, there is a method which entails obtaining access to a virtual reality subsystem and a hearing prosthesis, providing from the virtual reality subsystem a first output to the hearing prosthesis, evoking, utilizing the hearing, a hearing percept in a recipient thereof based on the first output, simultaneously providing second output to the recipient of the hearing prosthesis to evoke a second sensation different from hearing, wherein the second sensation is a sensation that results from the real-life physical phenomenon that results in the hearing percept.

In an exemplary embodiment, there is a method that includes any of the method actions detailed herein and/or variations thereof, along with utilizing a system according to any of the systems detailed herein and/or variations thereof to train the recipient in sound-object association by evoking a hearing percept of a sound produced by an object and presenting an image of the object using the virtual reality sub-system. In an exemplary embodiment, there is a method that includes obtaining access to a system according to any of the systems detailed herein, and utilizing the system to train the recipient in sound-location association by evoking a hearing percept of a sound and providing a virtual-reality stimulus to the recipient indicative of a directional origin of the sound. Still further, in an exemplary embodiment, there is a method that includes obtaining access to a system according to any of the system detailed herein, and utilizing the system to train the recipient in reverberant sound recognition by evoking a hearing percept of a sound and providing an image of an environment in which the sound having a given reverberation is heard. Still further, in an exemplary embodiment, there is a method that includes obtaining access to a system according to any of the system detailed herein, and utilizing the system to train the recipient to recognize and/or differentiate between speech types by evoking a hearing percept of speech and providing an image of a speaker.

Still further, in an exemplary embodiment, there is a method that includes obtaining access to a system according to any of the system detailed herein, and utilizing the system to provide a visual sensation as the second sensation and a third tactical sensation which also results from the real-life physical phenomenon that results in the hearing percept. Still further, in an exemplary embodiment, there is a method that includes obtaining access to a system according to any of the system detailed herein, and utilizing the system to automatically select a given hearing-second sensation scenario to provide to the recipient based on input indicative of an inability of the recipient to distinguish the scenario from another similar scenario. Still further, in an exemplary embodiment, there is a method that includes obtaining access to a system according to any of the system detailed herein, and utilizing the system such that the first output to the hearing prosthesis evokes a hearing percept of a reverberant sound, and the system provides a visual cue corresponding to an environment in which the reverberant sound is heard using the virtual reality sub-system.

Any disclosure of any sensory input detailed herein to a recipient, whether directly or indirectly, can be generated or otherwise provided by a virtual reality system in at least some exemplary embodiments, and thus any disclosure of any sensory input detailed herein to a recipient corresponds to a disclosure by way of example only and not by way of requirement, to providing sensory input to a recipient via a virtual reality system.

It is noted that the teachings detailed herein respect to the systems and methods and devices for training the recipient are configured to and or results in, in some embodiments, the inducement of plasticity of the neural system of the recipient. In an exemplary embodiment, the training detailed herein induces plasticity into the brain so as to enable the brain to perceive sounds in a manner more consistent with that perceived by a normal hearing user, or at least to enable the recipient to better associate sounds with events/objects and/or to better determine directionality of sounds.

It is briefly noted that any method action herein can be executed automatically, semi-automatically, or manually depending on the embodiment.

Without being bound by theory, it is believed that the systems and methods detailed herein embrace the fact that a different pattern of signal is sent to the brain for the cochlear implant user than that which is the case for a normal hearing person (which includes a person who utilizes a standard hearing aid where the sound is simply amplified, and the recipient receives the sound to the same auditory pathway as a normal hearing person without a hearing impairment). Thus, in exemplary scenarios where the electrical stimulation associated with the cochlea of a normal hearing person is thus different than the electrical stimulation of the cochlea by a cochlear implant, the teachings detailed herein can, in some embodiments, train the brain to reestablish associations of visual or other non-hearing sensory input to the sound input.

With respect to object association (and thus event association), in at least some exemplary embodiments, executing the methods and utilizing the systems detailed herein, the cochlear implant recipient's brain is trained or retrained to associate sounds with objects. While the embodiments detailed above have been in many instances directed towards relatively loud objects (or, more accurately, objects that make a relatively loud sound when utilized in operation), it is also noted that the teachings detailed herein can be applicable to objects that are relatively quiet or make a relatively neutral background noise that one might otherwise ignore. By way of example only and not by way of limitation, sounds such as a coffee machine in operation, a photocopier in operation, a printer in operation, a fan, etc. Any sound they can be represented by an audio cue and that has a correlated visual, tactile, or other sensory cue, can be utilized according to the methods and systems detailed herein. The methods and systems detailed herein can thus, in an exemplary embodiment, cause the recipient to learn to associate an audio cue with a visual cue or other sensory cue.

With respect to locational association (and thus event association), in at least some exemplary embodiments, executing the methods and utilizing the systems detailed herein, the cochlear implant recipient's brain is trained or retrained to determine the origins of sound. The methods and systems detailed herein can thus, in an exemplary embodiment, cause the recipient to learn to associate an audio directional cue with a visual cue or other sensory cue.

It is noted that the virtual reality systems detailed herein can be systems that are based entirely with the recipient, and/or can be systems that are bifurcated or are trifurcated or otherwise divided between two or more geographic regions and potentially link to one another by way of the Internet or the like. It is also noted that in at least some exemplary embodiments, while the disclosure herein has been presented in terms of a virtual reality system utilizing virtual reality technology, in some alternate embodiments, standard technologies can be utilized that are non-virtual-reality based. Accordingly, any disclosure herein of a virtual-reality based system or method corresponds to a disclosure with respect to an alternate embodiment where a non-virtual-reality system is utilized, and vice versa.

An exemplary system and an exemplary device/devices that can enable the teachings detailed herein, which in at least some embodiments can utilize automation, will now be described in the context of a recipient operated system. That is, an exemplary embodiment includes executing one or more or all of the methods detailed herein and variations thereof, at least in part, by a recipient.

Figure 20:
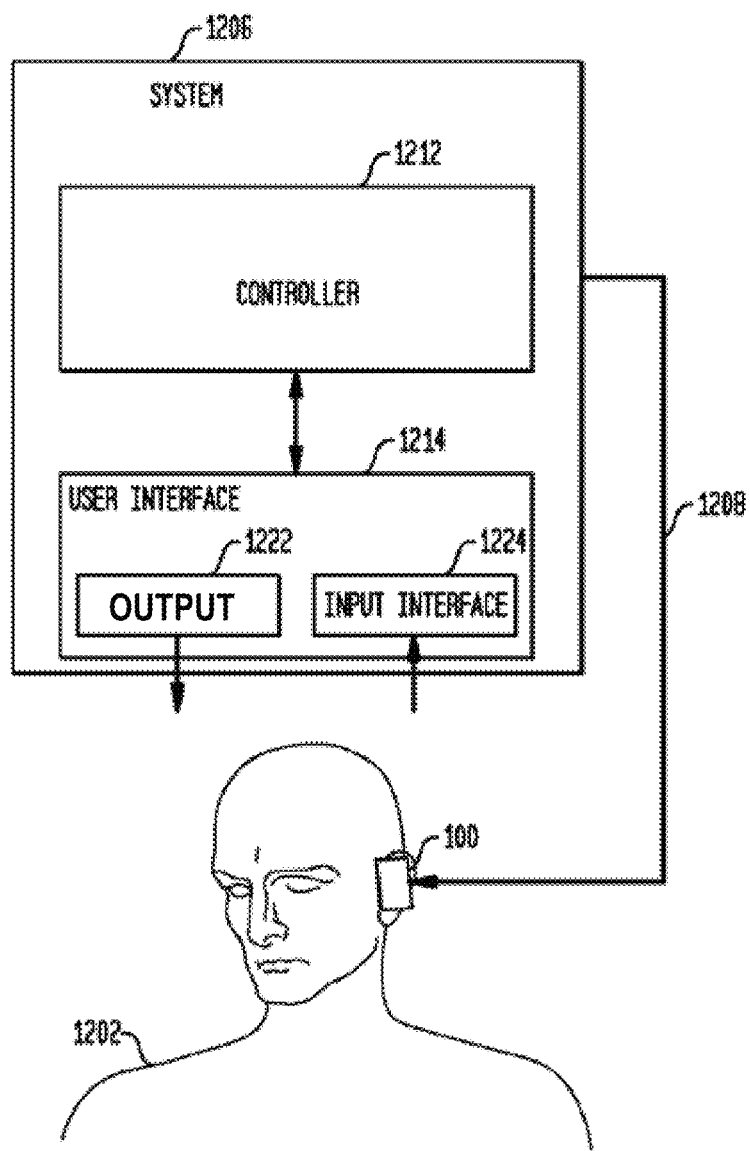
FIG. 20 presents another exemplary functional schematic of a system according to an exemplary embodiment, with which one or more or all of the various method actions detailed herein can be implemented.

FIG. 20 is a schematic diagram illustrating one exemplary arrangement in which system 1206 can be used to execute one or more or all of the method actions detailed herein in conjunction with the use of a hearing prosthesis, such as cochlear implant system 100. System 1206 will be described, at least in part, in terms of interaction with a recipient. In an exemplary embodiment, system 1206 is a recipient controlled system. Indeed, in at least some exemplary embodiments, the implementation of some or all the methods detailed herein and/or variations thereof is recipient directed, at least in part. That said, in at least some exemplary alternative embodiments, the implementation of some or all of the methods detailed herein and/or variations thereof is clinician directed, at least in part.

In an exemplary embodiment, system 1206 can be a system having additional functionality according to the method actions detailed herein. In the embodiment illustrated in FIG. 20, the cochlear implant system can be directly connected to system 1206 to establish a data communication link 1208 between the speech processor 100 and system 1206. System 1206 is thereafter bi-directionally coupled by a data communication link 1208 with speech processor 100. While the embodiment depicted in FIG. 20 depicts a system 1206 and a hearing prosthesis connected via a cable, any communications link that will enable the teachings detailed herein that will communicably couple the implant and system can be utilized in at least some embodiments.

System 1206 can comprise a system controller 1212 as well as a user interface 1214. Controller 1212 can be any type of device capable of executing instructions such as, for example, a general or special purpose computer, a handheld computer (e.g., personal digital assistant (PDA)), digital electronic circuitry, integrated circuitry, specially designed ASICs (application specific integrated circuits), firmware, software, and/or combinations thereof. As will be detailed below, in an exemplary embodiment, controller 1212 is a processor. Controller 1212 can further comprise an interface for establishing the data communications link 1208 with the device 100 (e.g., cochlear implant 100). In embodiments in which controller 1212 comprises a computer, this interface may be for example, internal or external to the computer. For example, in an embodiment, controller 1212 and cochlear implant may each comprise a USB, Firewire, Bluetooth, Wi-Fi, or other communications interface through which data communications link 1208 may be established. Controller 1212 can further comprise a storage device for use in storing information. This storage device can be for example, volatile or non-volatile storage, such as, for example, random access memory, solid state storage, magnetic storage, holographic storage, etc.

User interface 1214 can comprise an output 1222, which can correspond to the virtual reality output (image, tactile, smell, etc.) and/or can also correspond to the non-virtual-reality output (general computer display, general television screen etc.) and an input interface 1224. Output 1222 can be, for example, any type of display device, such as, for example, those commonly used with computer systems. In an exemplary embodiment, element 1222 corresponds to a device configured to visually display an image to the recipient 1202 corresponding to the object or event that creates the sound, and/or visually display the environment in which the recipient is located, as detailed above.

In an exemplary embodiment, user interface 1214 is configured to receive one or more or all of the data as detailed herein and/or variations thereof. By way of example only and not by way of limitation, the interface can enable a recipient to input answers to a test and/or to input data indicative of the types of hearing scenarios that the recipient wants to train on. In an exemplary embodiment, as will be described in greater detail below, user interface 1214 is configured to enable the recipient to input data relating to any of the method actions detailed herein and/or variations thereof. In an exemplary embodiment, user interface 1214 is configured to receive the feedback from the recipient according to the teachings detailed herein, whether that is an affirmative action by the recipient to input information into the system 1206, or the system 1206 monitoring the recipient with a camera or other sensors as detailed herein. It is further noted that in an exemplary embodiment, user interface 1214 is configured to provide the test(s) to the recipient. It is noted that the term data as used herein encompasses any of the input and/or the output detailed herein.

Input interface 1224 can be any type of interface capable of receiving information from a patient, such as, for example, a computer keyboard, mouse, voice-responsive software, touchscreen (e.g., integrated with output 1222), microphone (e.g. optionally coupled with voice recognition software or the like), retinal monitor (which can have utilitarian value with respect to tracking the eyes of a recipient, which can indicate from what direction a recipient perceives the origination of a sound, a joystick, and any other data entry or data presentation formats now or later developed. It is noted that in an exemplary embodiment, output 1222 and input interface 1224 can be the same component, e.g., in the case of a touch screen). In an exemplary embodiment, input interface 1224 is a device configured to receive input from the recipient indicative of a choice of one or more of the plurality of words presented by output 1222.

In an exemplary embodiment, output 1222 is configured to display some or all of the information conveyed to the recipient detailed herein. By way of example only and not by way of limitation, in an exemplary embodiment, output 1222 is configured to display a graph showing the rate of habilitation and/or rehabilitation of the recipient and/or the status of the habilitation and/or rehabilitation of the recipient. That said, alternatively and/or in addition to this, the user interface 1214 is configured to provide aural data to the recipient.

Of course, in some embodiments, the system is configured to present to the recipient an audible word or a plurality of words or a sentence of words so that the testing actions detailed herein can be performed aurally.

It is noted that in at least some exemplary embodiments, the system 1206 is configured to execute one or more or all of the method actions detailed herein, where the various sub-components of the system 1206 are utilized in their traditional manner relative to the given method actions detailed herein. By way of example only and not by way of limitation, the controller 1212 of the system 1206 is configured to obtain the data indicative of the recipients ability to differentiate and/or recognize and/or determine the origination location of sound, etc. In this regard, by "obtain," it is meant by way of example that the controller 1212, which can correspond to a processor in at least some embodiments, calculates the data itself (thus obtaining the data).

In an exemplary embodiment, system 1206 corresponds to subsystem 1910 of FIG. 19. That said, in an alternate embodiment, system 1206 correspond to a non-virtual-reality system. In an exemplary embodiment, system 1206 is further configured to present to the device 100 (e.g., cochlear implant 100) the sounds detailed herein with respect to the methods detailed herein. An exemplary embodiment, system 1206 includes a speaker or the like which generates an acoustic signal corresponding to the audible sentence that is picked up by a microphone of the hearing prosthesis 100. In an alternate embodiment, system 1206 is configured to provide a non-acoustic signal (e.g., an electrical signal) to the hearing prosthesis processor by bypassing the microphone thereof, thereby presenting an audible sound to the hearing prosthesis. Any device, system and/or method that is configured to receive input from the recipient can be utilized in at least some embodiments.

It is further noted that in at least some embodiments, a speech recognition algorithm can be coupled with a feedback system that presents information to the recipient indicative of what the speech recognition algorithm perceived as being spoken by the recipient. In this manner, the recipient can be provided with an indication of what the system perceived as being spoken, and can correct the system with respect to what the recipient actually said if there is a misperception (e.g., by the recipient repeating the words, the recipient typing in the actual words, etc.).

An exemplary embodiment, processor 1212 is configured to evaluate the received input for congruence between the perceived word(s)/sentence and the audible word(s)/sentence. In an exemplary embodiment, this entails comparing the word(s)/sentence that the recipient touched on the touchscreen to the word(s)/sentence forming the basis of the audible sentence. In an alternate exemplary embodiment, this entails comparing data from speech recognition software based on the recipient's response captured by microphone with the word(s)/sentence forming the basis of the audible sentence.

More specifically, with reference to the system 1206, in an exemplary embodiment, system 1206 is a system configured to execute actions 220 and producing the second input of action 230 detailed above. In an exemplary embodiment, system 1206 is a system configured to produce the third input of method action 320 detailed above, the fourth input of method action 420 detailed above, and/or the input of method action 520 detailed above. In an exemplary embodiment, system 1206 is a system configured to direct the execution of methods 200, 300, 400, 500 and 600 and 700 detailed above, automatically and/or semi-automatically. In an exemplary embodiment, system 1206 is configured to provide the non-sound stimulation of method action 810 and method action 820 detailed above, and control the cochlear implant to produce the sound stimulation portion of method action 810 and method action 820 detailed above.

In an exemplary embodiment, system 1206 is configured to execute method action 920 and to direct the execution of method 910 and 930 detailed above, as well as providing that the non-sound stimulation portions with respect to the third sound and non-sound stimulation scenario as well as to control the hearing prosthesis to produce the third sound portion of method action 930.

In an exemplary embodiment, system 1206 is configured to execute method actions 1320, 1330 and direct the execution of method actions 1310 and 1340, including providing the non-sound stimulation portion of method action 1340, and controlling the cochlear implant or other hearing prosthesis to produce the third sound portion of method action 1340. In an exemplary embodiment, system 1206 is configured to execute method action 1420. In an exemplary embodiment, system 1206 is configured to execute method actions 1520 and 1530. In an exemplary embodiment, system 1206 is configured to execute any one or more of the method actions of method 1600 and/or method 1700. In an exemplary embodiment, system 1206 is configured to execute method action 1820 and/or method action 1830, and/or otherwise direct the execution of method 200

In an exemplary embodiment, the processor 1212 is configured to develop any data that has utilitarian value with respect to implementing the methods and/or systems detailed herein and/or otherwise has utilitarian value with respect to enabling the methods and/or systems detailed herein.

In an exemplary embodiment, the system 1206 is configured to execute a genetic algorithm to select given stimulation scenarios. In an exemplary embodiment, system 1206 utilizes machine learning to execute one or more of the method actions detailed herein.

It is noted that the system 1206, detailed above, can execute one or more or all of the actions detailed herein and/or variations thereof automatically, at least those that do not require the actions of a recipient. It is noted that the schematic of FIG. 20 is functional. In some embodiments, a system 1206 is a self-contained device (e.g. a laptop computer, a so-called smart phone, etc.) that is configured to execute one or more or all of the method actions detailed herein and/or variations thereof, aside from those that utilize the recipient and/or the audiologist without receiving input from an outside source. In an alternative embodiment, system 1206 is a system having components located at various geographical locations. By way of example only and not by way of limitation, user interface 1214 can be located with the recipient, and the system controller (e.g., processor) 1212 can be located remote from the recipient. By way of example only and not by way of limitation, the system controller 1212 can communicate with the user interface 1214 via the Internet and/or via cellular communication technology or the like. Indeed, in at least some embodiments, the system controller 1212 can also communicate with the device 100 via the Internet and/or via cellular communication or the like. In an exemplary embodiment, the user interface 1214 can be a portable communications device, such as by way of example only and not by way of limitation, a cell phone and/or a so-called smart phone. Indeed, user interface 1214 can be utilized as part of a laptop computer or the like. Any arrangement that can enable system 1206 to be practiced and/or that can enable a system that can enable the teachings detailed herein and/or variations thereof to be practiced can be utilized in at least some embodiments.

Accordingly, an exemplary embodiment entails executing some or all of the method actions detailed herein where the recipient of the hearing prosthesis is located remotely (e.g., geographically distant) from where at least some of the method actions detailed herein are executed (e.g., any method action detailed herein that can be executed via the controller 1212). For example, the method of flowchart 200 could be executed via internet communication with the hearing prosthesis and the controller 1212. Indeed, in an exemplary embodiment, method action 210 can be executed at location A, method 220 can be executed at location B, and method 230 can be executed at location A. Location B could be, for example, the location of a remote server, where location A is "connected" via the remote server. That is, any method action herein can be executed at one location, and any method action herein can be executed at another location, and so on, providing that the teachings detailed herein and/or variations thereof can be practiced.

It is further noted that in at least some embodiments, the system 1206 can enable the teachings detailed herein and/or variations thereof to be practiced at least without the direct participation of a clinician (e.g., an audiologist). Indeed, in at least some embodiments, the teachings detailed herein and/or variations thereof, at least some of them, can be practiced without the participation of a clinician entirely. In an alternate embodiment, the teachings detailed herein and/or variations thereof, at least some of them, can be practiced in such a manner that the clinician only interacts otherwise involves himself or herself in the process to verify that the results are acceptable or otherwise that desired actions were taken. In the above, it is noted that in at least some embodiments, a computerized automated application can be implemented to score or otherwise determine the results of the tasks detailed herein (e.g. listening task and/or memory task).

It is noted that any method detailed herein also corresponds to a disclosure of a device and/or system configured to execute one or more or all of the method actions associated there with detailed herein. In an exemplary embodiment, this device and/or system is configured to execute one or more or all of the method actions in an automated fashion. That said, in an alternate embodiment, the device and/or system is configured to execute one or more or all of the method actions after being prompted by the recipient and/or by the clinician.

It is further noted that any device and/or system detailed herein having functionality also corresponds to a disclosure of a method that includes such functionality in method actions. It is also noted that any device and/or system detailed herein also corresponds to a disclosure of a method of operating or otherwise utilizing that device.

Any embodiment detailed herein can be combined with any other embodiment detailed herein unless explicitly stated that such cannot be done so or otherwise the art does not enable touch embodiment. In this regard, any single method action detailed herein can be combined with any other single method action detailed herein, the just noted caveats notwithstanding.

It is noted that any method detailed herein also corresponds to a disclosure of a device and/or system configured to execute one or more or all of the method actions associated there with detailed herein. In an exemplary embodiment, this device and/or system is configured to execute one or more or all of the method actions in an automated fashion. That said, in an alternate embodiment, the device and/or system is configured to execute one or more or all of the method actions after being prompted by the recipient and/or by the clinician.

It is noted that embodiments include non-transitory computer-readable media having recorded thereon, a computer program for executing one or more or any of the method actions detailed herein. Indeed, in an exemplary embodiment, there is a non-transitory computer-readable media having recorded thereon, a computer program for executing at least a portion of, including all of, method 200, method 300, method 400, method 500, method 600, method 700, method 800, method 900, method 1300, method 1400, method 1500, method 1600, method 1700 and/or method 1800.

Still further, in an exemplary embodiment, the media comprises code for providing the recipient with at least one of tests detailed herein that enable the rate and/or the progress of the recipient to be ascertained.

Figure 21:
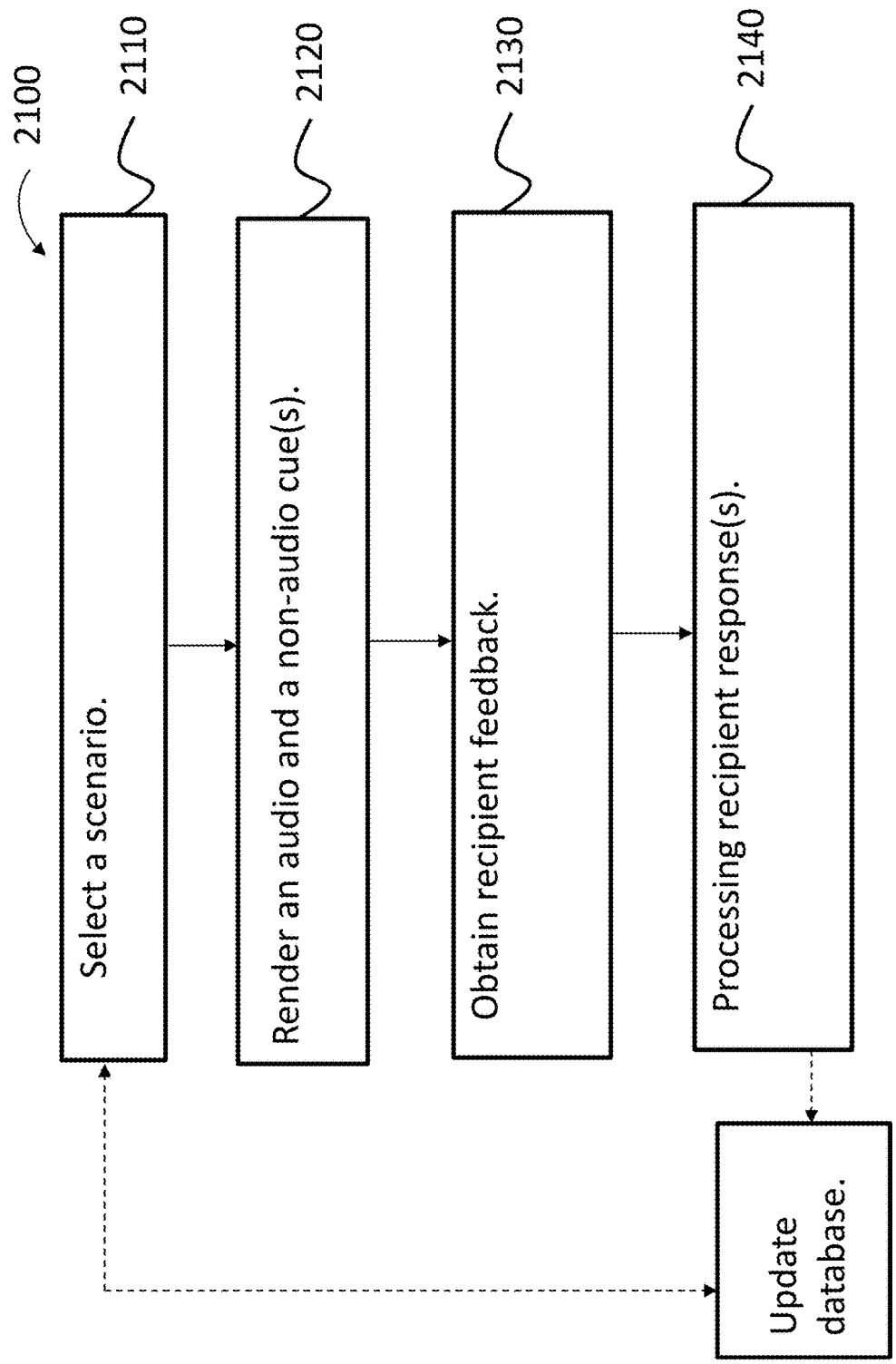
FIG. 21 presents an exemplary flowchart for an exemplary method according to an exemplary embodiment.

FIG. 21 depicts another exemplary flowchart for an exemplary method, method 2100, which includes method action 2110, which include selecting a scenario for training, an example, the selected scenario can be any of the scenarios detailed herein or variations thereof, whether such be object association and/or differentiation, reverberation training, locational training, etc. Method 2100 further includes method action 2120, which includes rendering and audio and a non-audio cue(s), where the non-audio cues can be visual, or any of the other non-audio cues detailed herein. Method action 2130 follows method action 2120, which includes obtaining user feedback. In an exemplary embodiment, this can be any of the types of feedback detailed herein and/or any of the mediums of feedback detailed herein and/or variations thereof. Further, it is noted that with respect to the methods detailed herein, where, as noted above, the methods detailed herein are not mutually exclusive to one another, and such can be practiced simultaneously with one another and/or portions of methods can be combined with one another, the action of obtaining recipient feedback can be performed for each scenario on a repeated basis, such as subsequent to and/or contemporaneous with the presentation of the given scenarios. At method action 2140, the recipient response(s) is processed, such as a determination is made whether or not the recipient has correctly identified or otherwise distinguished the given sound from another sound, etc. As can be seen, a database is updated based on the processed recipient response, and this updated database can be utilized to select a scenario. Consistent with the teachings detailed above, in an exemplary embodiment, the selection of a given scenario can correspond to the selection of a level of complexity of a given scenario based on the recipient's rate of habilitation and/or rehabilitation, and/or the status of the habilitation and/or rehabilitation, where the habilitation and/or rehabilitation data can be stored in the database and can be arrived at at least in part based on the processed user response.

In an exemplary embodiment, the virtual reality systems detailed herein are configured to make the recipient feel like he/she is seeing things which are 'in motion' and experiencing sounds in reality both at the same time and/or in temporal proximity to one another according to the teachings detailed herein, or which are temporally aligned with one another. Embodiments of the teachings detailed herein provide a customized and gradual enhanced training regime, where the system can start the recipient with a basic hearing profile. When the recipient is becoming familiar with the sounds, the system can begin to train the recipient to achieve a certain degree of self-directed fitting resulting in a potential to both improve hearing outcomes as well as streamline the fitting process. With this system, the recipient can already be fitted with most of the settings covered by the actual fitting session. This enables the recipients to make changes for themselves in a safe environment in a more time effective and cost effective way as well as alleviating some of the work from the clinician. When a time is due for the newly implant recipient to attend the actual fitting session, only minor proper adjustments will be made by a clinician. The virtual reality sound environment allows the user to interact with the objects of this environment where the above sounds would be distributed.

In an exemplary embodiment with respect to fitting, "pristine" sounds can be provided to the recipient, and the recipient can adjust settings of a hearing prostheses in real time or in an iterative manner with the pristine sound presentation to the implant, and thus to the recipient, so that the recipient can adjust the cochlear implant to his or her liking or otherwise to a utilitarian setting. Note further that in at least some exemplary embodiments, the teachings detailed herein with respect to sound discrimination, locational training, reverberant sound training, and speech training, can be provided so as to enable the recipient to adjust the fitting settings on his or her implant. Still further, in an exemplary embodiment, the system detailed herein can automatically adjust the settings in an iterative manner and/or based on the feedback from the recipient so as to fine-tune or otherwise provide adjustments to the fitting of the prosthesis. In an exemplary scenario, such as with respect to the methods detailed herein where two different sound species are provided, the settings of the implant can be adjusted such that the perceived as sound of the two different objects is distinctly different to the recipient. That is, adjustments can be made to the fitting of a cochlear implant that enhance the differences in the sounds that objects and/or events make, so that when the recipient hears the sounds of the real world, the recipient will be able to better distinguish and/or recognize the given sounds.

Accordingly, in an exemplary embodiment, there is an exemplary method of providing the given sound scenarios detailed herein coupled with the non-sound stimulations detailed herein, and adjusting the fitting settings of the implant to improve or otherwise increase the perceived differences in the sounds, or otherwise to improve the recognition of a given sound, wherein these fitting settings are maintained after the training session. Still further, it is to be understood that these teachings can be applicable to the scenarios associated with providing different types of speech. Accordingly, in an exemplary embodiment, there is an exemplary method of providing a given speech scenario detailed herein coupled with non-sound stimulations detailed herein, and adjusting the fitting settings of the implant to improve or otherwise increase the perceived differences in the sounds, or otherwise to improve the recognition of a given sound, wherein these fitting settings are maintained after the training session. By "maintained after the training session," such includes the ability to store a plurality of settings for a given sound scenario, which a recipient can change between the given settings.

Also, in an exemplary embodiment, there is an exemplary method of providing the given reverberant environment and/or sound locational scenarios detailed herein coupled with the non-sound stimulations detailed herein, and adjusting the fitting settings of the implant to improve or otherwise increase the perceived differences in the sounds, or otherwise to improve the recognition of a given sound, wherein these fitting settings are maintained after the training session. In an exemplary embodiment, the system could be used to train recipients to become accustomed to signal processing algorithms involving directionality adjustment/beamforming, and/or other signal processing algorithms. The system could expose the recipient to how the auditory environment is perceived with the algorithm on/engaged and without the algorithm on/engaged, to understand, assess, and fine-tune the algorithm/control settings.

Figure 22:
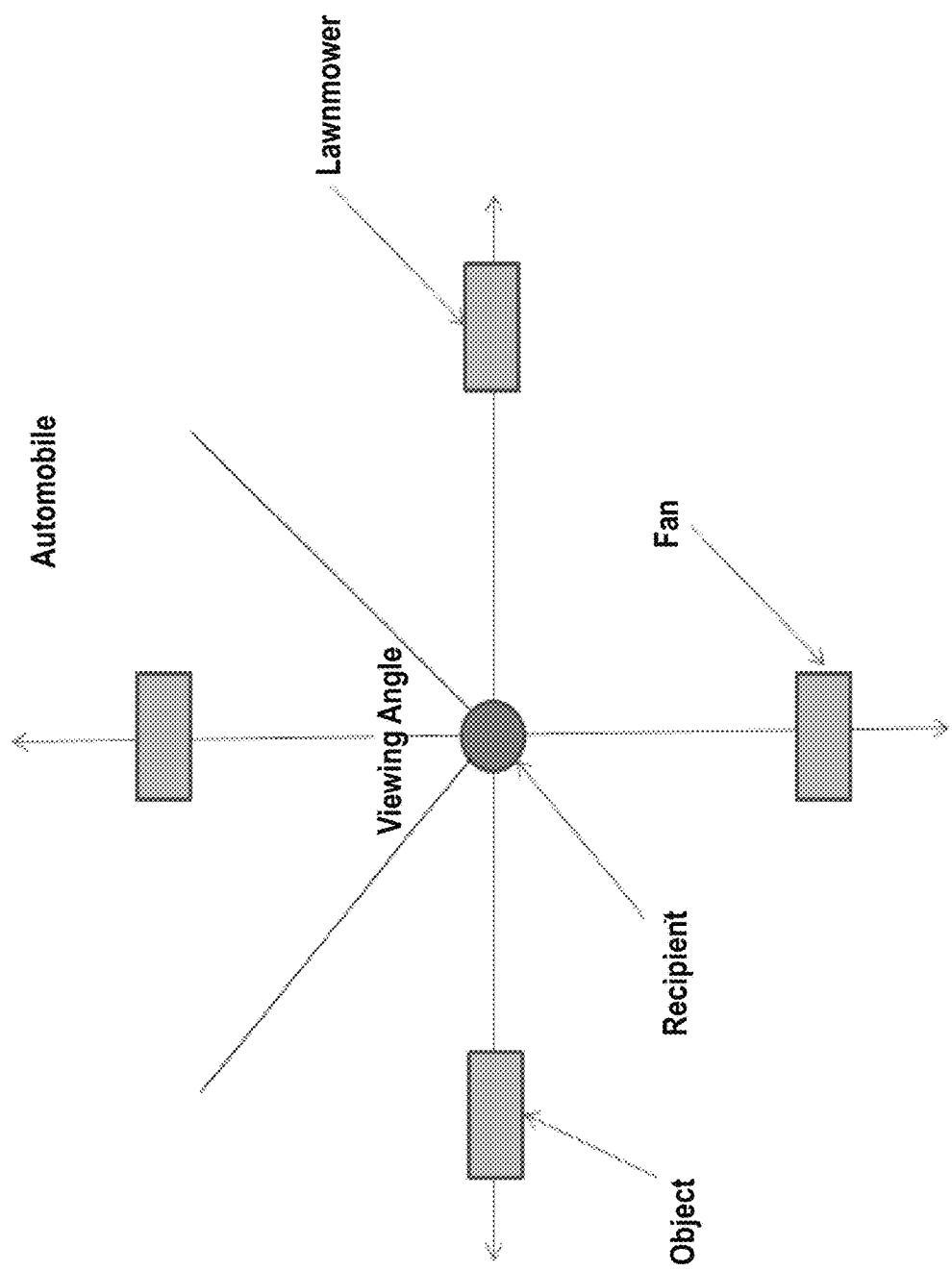
FIG. 22 presents a conceptual schematic of a virtual reality world of a recipient.

FIG. 22 presents a conceptual schematic of a virtual-reality space with objects oriented about the recipient. In an exemplary embodiment, in the virtual-reality space, the recipient can face a given object such that he or she can then hear the object making the noise, and the sound of the recipient here is can be adjusted to reflect the fact that the recipient is changing the position of his or her head. Accordingly, in an exemplary embodiment, there is a method of providing the recipient sound input that varies with the change in view of the recipient as the recipient turns his or her head. As will be understood from FIG. 22, with respect to a plurality of objects, the sounds may dominate one another with respect to which objects are within the viewing angle of the recipient, and thus some exemplary embodiments include methods that provide sound to dominate one another. It is to be understood that in an exemplary embodiment, there is a system for executing the aforementioned method(s).

In view of the above, it can be seen that in an exemplary embodiment, there is a method, comprising obtaining access to a virtual reality system; activating a cochlear implant such that the cochlear implant evokes a hearing percept based on first input; and receiving second input from the virtual reality system in temporal proximity with the evocation of the hearing percept based on the first input, wherein the cochlear implant evokes a hearing percept based on the first input, and the second input is correlated with the first input. In an exemplary embodiment, this method further comprises the actions of activating the cochlear implant such that the cochlear implant evokes a hearing percept based on a third input; and receiving fourth input from the virtual reality system while receiving third input with the cochlear implant, wherein the first input is based on musical notes played by a first musical instrument; the third input is based on the musical notes but played by a second musical instrument of a different type than the first musical instrument; and the second and fourth inputs are images of the respective first and second musical instruments.

In an exemplary embodiment, there is a system, comprising a virtual reality sub-system; and a hearing prosthesis, wherein the virtual reality sub-system is configured to provide first output to the hearing prosthesis, the hearing prosthesis is configured to evoke a hearing percept in a recipient thereof based on the first output, the virtual reality sub-system is configured to simultaneously provide second output to the recipient of the hearing prosthesis to evoke a second sensation different from hearing, and the second sensation is a sensation that results from the real-life physical phenomenon that results in the hearing percept. In an exemplary embodiment, this system is such that the first output to the hearing prosthesis evokes a hearing percept of a reverberant sound; and the system is configured to provide a visual cue corresponding to an environment in which the reverberant sound is heard using the virtual reality sub-system.

In an exemplary embodiment, there is a method, comprising: a first action of evoking an artificial hearing percept in a recipient of a hearing prosthesis based on input indicative of a first sound; second action of receiving first visual input, which first visual input is correlated with the first sound, wherein the second action is executed in effective temporal correlation with the first action; and repeating the first and second actions, thereby improving the recipient's ability to recognize the first sound. In an exemplary embodiment of this method, the first visual input represents a static object.

In an exemplary embodiment, there is a method, comprising training or retraining a recipient of a cochlear implant to recognize and/or distinguish sounds using virtual reality. In an exemplary embodiment of this method, the method further comprises determining a rate of habilitation or rehabilitation of the recipient with respect to hearing; and selecting a sound scenario based on the determined rate, wherein the action of training or retraining includes providing the selected sound scenario coupled with virtual reality based non-sound stimulation.

It is further noted that any device and/or system detailed herein also corresponds to a disclosure of a method of operating that device and/or using that device. Furthermore, any device and/or system detailed herein also corresponds to a disclosure of manufacturing or otherwise providing that device and/or system.

While various embodiments of the present invention have been described above, it should be understood that they have been presented by way of example only, and not limitation. It will be apparent to persons skilled in the relevant art that various changes in form and detail can be made therein without departing from the spirit and scope of the invention.

What is claimed is:

1. A method, comprising:
training or retraining a recipient of a cochlear implant to recognize and/or distinguish sounds using virtual reality; and
determining a stage of the recipient's hearing habilitation or rehabilitation progress; and
selecting a sound scenario based on the determined stage, wherein
the action of training or retraining includes providing the selected sound scenario coupled with virtual reality based non-sound stimulation.

2. The method of claim 1, further comprising:
obtaining access to a virtual reality system;
activating the cochlear implant such that the cochlear implant evokes a hearing percept based on first input; and
receiving second input from the virtual reality system in temporal proximity with the evocation of the hearing percept based on the first input, wherein
the cochlear implant evokes a hearing percept based on the first input, and
the second input is correlated with the first input.

3. The method of claim 2, wherein:
the first input is generated by the virtual reality system.

4. The method of claim 2, wherein:
the second input is visual input.

5. The method of claim 4, further comprising:
receiving third input generated by the virtual reality system in temporal proximity with the evocation of the hearing percept based on the first input, wherein the third input is a different type of input than that of the first input or second input.

6. The method of claim 5, wherein:
the third input is a tactile input.

7. The method of claim 5, wherein:
the third input is a smell input.

8. The method of claim 2, wherein:
the first input is representative of an event species of a genus of events; and
the second input is representative of the event species.

9. The method of claim 2, wherein:
the first input and the second input is generated by the virtual reality system and the second input is visual input of a sound generating thing.

10. A system, comprising:
a virtual reality sub-system; and
a hearing prosthesis, wherein
the virtual reality sub-system is configured to provide first output to the hearing prosthesis,
the hearing prosthesis is configured to evoke a hearing percept in a recipient thereof based on the first output,
the virtual reality sub-system is configured to simultaneously provide second output to the recipient of the hearing prosthesis to evoke a second sensation different from hearing, and the second sensation is a sensation that results from the real-life physical phenomenon that results in the hearing percept, wherein
the system is configured to train the recipient in reverberant sound recognition by evoking a hearing percept of a sound and providing an image of an environment in which the sound having a given reverberation is heard.

11. The system of claim 10, wherein:
the system is configured to train the recipient in sound-object association by evoking a hearing percept of a sound produced by an object and presenting an image of the object using the virtual reality sub-system.

12. The system of claim 10, wherein:
the system is configured to train the recipient in sound-location association by evoking a hearing percept of a sound and providing a virtual-reality stimulus to the recipient indicative of a directional origin of the sound.

13. The system of claim 10, wherein:
the system is configured to train the recipient to recognize and/or differentiate between speech types by evoking a hearing percept of speech and providing an image of a speaker.

14. The system of claim 10, wherein:
the system is configured to provide a visual sensation as the second sensation and a third tactical sensation which also results from the real-life physical phenomenon that results in the hearing percept.

15. The system of claim 10, wherein:
the evoked hearing percept based on the first output corresponds to a hearing-first sensation scenario; and
the system is configured to automatically select a given hearing-second sensation scenario to provide to the recipient based on input indicative of an inability of the recipient to distinguish the hearing-first sensation scenario from another similar scenario.

16. The system of claim 10, wherein:
the first output and the second output are part of a first stimulation scenario that includes a first sound scenario and a first non-sound stimulation scenario;
the system is configured to output a second sound and a second non-sound that is part of a second non-sound stimulation scenario,
the first sound and the second sound is generated entirely by the virtual reality sub-system; and
the non-sound stimulation scenarios are generated entirely by the virtual reality sub-system.

17. A method, comprising:
(i) providing a recipient of a cochlear implant hearing prosthesis a first sound and non-sound stimulation scenario, wherein an artificial hearing percept of the first sound is evoked with the hearing prosthesis; and
(ii) providing the recipient of the hearing prosthesis a second sound and non-sound stimulation scenario wherein an artificial hearing percept of the second sound is evoked with the hearing prosthesis, wherein
the non-sound stimulation is a virtual reality initiated stimulation, and
the provided scenarios train or retrain the recipient to associate the respective sounds with the respective non-sound stimulation, wherein
actions "i" and "ii" are executed during a first temporal period where the first sound and the second sound are sounds that the recipient initially cannot routinely distinguish as being respectively associated with the respective non-sound stimulations, and
the method further comprises:
  (iii) determining, during a second temporal period subsequent to the first temporal period, that the recipient routinely distinguishes the first sound and the second sound as being respectively associated with the respective non-sound stimulations; and
  (iv) providing the recipient of the hearing prosthesis a third sound and non-sound stimulation scenario wherein an artificial hearing percept of the third sound is evoked with the hearing prosthesis, wherein
the third non-sound stimulation is a virtual reality initiated stimulation, and
at least one of the first sound or the second sound and the third sound are sounds that the recipient initially cannot routinely distinguish as being respectively associated with the respective non-sound stimulations.

18. The method of claim 17, wherein:
the first sound and the second sound are sounds that the recipient initially cannot routinely distinguish as being respectively associated with the respective non-sound stimulations.

19. The method of claim 17, wherein:
the first sound and the second sound are respective sound species of a sound genus and the first non-sound stimulation and the second non-sound stimulation are respective image species of an image genus.

20. The method of claim 17, wherein:
action "i" is repeatedly executed independently of action "ii" until the recipient has learned to associate the first sound with the first non-sound stimulation;
action "ii" is repeatedly executed in combination with action "i" after the recipient has learned to associate the first sound with the first non-sound stimulation.

21. The method of claim 17, further comprising:
subsequent to the actions of "i" and "ii," obtaining recipient feedback indicative of the ability of the recipient to correctly correlate the first sound with the first non-sound stimulation scenario without the recipient being exposed to the non-sound stimulation scenario and the ability of the recipient to correctly correlate the second sound with the second non-sound stimulation scenario without the recipient being exposed to the non-sound stimulation scenario; and
determining, based on the obtained recipient feedback, that the recipient correctly correlated the first sound with the first non-sound stimulation scenario and correctly correlated the second sound with the second non-sound stimulation scenario; and subsequent to the action of determining that the recipient correctly correlated the first sound with the first non-sound stimulation scenario and correctly correlated the second sound with the second non-sound stimulation scenario, providing the recipient a fourth sound and non-sound stimulation scenario wherein an artificial hearing percept of the fourth sound is evoked with the hearing prosthesis, wherein
the fourth sound is similar to the first and/or second sound, and the fourth non-sound stimulation is definitively different than the first and/or second non-sound stimulation.

22. The method of claim 17, wherein:
the first sound is speech of a woman and the first non-sound stimulation is a visual image of a woman; and
the second sound is speech of a man and the second non-sound stimulation is a visual image of a man.

23. A method, comprising:
training or retraining a recipient of a cochlear implant to recognize and/or distinguish sounds using virtual reality, wherein
the action of training or retraining includes providing audio-visual scenarios using virtual reality of increasing complexity as the recipient learns to recognize and/or distinguish sounds of the less complex scenarios.

24. The method of claim 23, wherein:
the method further comprises:
  receiving recipient feedback during and/or after the action of providing the respective audio-visual scenarios; and
  providing new audio-visual scenarios using virtual reality based on the received recipient feedback.

25. The method of claim 23, wherein:
the action of training or retraining results in the recipient distinguishing between different species of sounds of a genus of sounds, wherein the recipient could not distinguish between those different species of sounds prior thereto.

26. The method of claim 23, wherein:
the action of training or retraining results in the recipient being able to at least one of recognize a given sound in different reverberant environments or distinguish between a sound in different reverberant environments, wherein the recipient could not at least one of respectively recognize the sounds in the different reverberant environments prior thereto or distinguish between the sound in different reverberant environments prior thereto.

27. The method of claim 23, wherein:
the sounds are speech sounds.

28. The method of claim 23, wherein:
the sounds are non-speech sounds.

29. A system, comprising:
a virtual reality sub-system; and
a hearing prosthesis, wherein
the virtual reality sub-system is configured to provide first output to the hearing prosthesis,
the hearing prosthesis is configured to evoke a hearing percept in a recipient thereof based on the first output,
the virtual reality sub-system is configured to simultaneously provide second output to the recipient of the hearing prosthesis to evoke a second sensation different from hearing, and
the second sensation is a sensation that results from the real-life physical phenomenon that results in the hearing percept, wherein the evoked hearing percept based on the first output corresponds to a hearing-first sensation scenario, and
the system is configured to automatically select a given hearing-second sensation scenario to provide to the recipient based on input indicative of an inability of the recipient to distinguish the hearing-first sensation scenario from another similar scenario.

* * * * *